US012782915B2

(12) United States Patent
Takemoto et al.

(10) Patent No.: US 12,782,915 B2
(45) Date of Patent: Nov. 3, 2026

(54) MATERIAL DESIGN SUPPORT APPARATUS, MATERIAL DESIGN SUPPORT METHOD, AND PROGRAM

(71) Applicant: Resonac Corporation, Tokyo (JP)

(72) Inventors: Shimpei Takemoto, Tokyo (JP); Takeshi Kaneshita, Tokyo (JP); Yu Okano, Tokyo (JP); Yoshishige Okuno, Tokyo (JP)

(73) Assignee: RESONAC CORPORATION, Tokyo (JP)

(*) Notice: Subject to any disclaimer, the term of this patent is extended or adjusted under 35 U.S.C. 154(b) by 262 days.

(21) Appl. No.: 18/578,973

(22) PCT Filed: Jul. 15, 2022

(86) PCT No.: PCT/JP2022/027887
§ 371 (c)(1),
(2) Date: Jan. 12, 2024

(87) PCT Pub. No.: WO2023/002951
PCT Pub. Date: Jan. 26, 2023

(65) Prior Publication Data

US 2024/0319706 A1 Sep. 26, 2024

(30) Foreign Application Priority Data

Jul. 21, 2021 (JP) ................................ 2021-120261

(51) Int. Cl.
*G05B 19/40* (2006.01)
*G05B 19/4097* (2006.01)

(52) U.S. Cl.
CPC .................... *G05B 19/4097* (2013.01); *G05B 2219/45234* (2013.01)

(58) Field of Classification Search
CPC ...... G05B 19/4097; G05B 2219/45234; G06F 2111/04; G06F 2113/26; G06F 2119/14; G06F 2119/18; G06F 30/27; G06Q 50/04
(Continued)

(56) References Cited

U.S. PATENT DOCUMENTS

2020/0401113 A1* 12/2020 Yuan ................ G05B 19/41865
2022/0261510 A1* 8/2022 Takemoto ............... G06F 30/27
(Continued)

FOREIGN PATENT DOCUMENTS

CN 112912884 6/2021
JP 6617842 12/2019
(Continued)

*Primary Examiner* — Kira Nguyen
(74) *Attorney, Agent, or Firm* — IPUSA, PLLC

(57) ABSTRACT

A material design support apparatus for supporting optimization of a design condition for a material, the material design support apparatus including: a design condition setting unit configured to set a range of a design condition for a material; a required characteristic setting unit configured to set a range of a required characteristic of the material; an exhaustive prediction point generation unit configured to generate a plurality of exhaustive prediction points within the range of the design condition; a prediction unit configured to input the exhaustive prediction points into a trained model in which a correspondence between a design condition for the material and a characteristic value of the material is learned, thereby to predict a characteristic value of the material; and a design condition adjustment unit configured to adjust a range of the design condition for the material in which a plurality of exhaustive prediction points are subsequently generated.

10 Claims, 23 Drawing Sheets

(58) Field of Classification Search
USPC ............................................................ 700/97
See application file for complete search history.

(56) References Cited

U.S. PATENT DOCUMENTS

| | | | | |
|---|---|---|---|---|
| 2023/0103837 | A1* | 4/2023 | Ogino | B24B 39/00 700/47 |
| 2023/0153491 | A1* | 5/2023 | Kanazawa | G16C 60/00 703/1 |
| 2023/0376002 | A1* | 11/2023 | Ogawa | G16Y 10/25 |
| 2024/0028796 | A1* | 1/2024 | Hanaoka | G06Q 10/0631 |

FOREIGN PATENT DOCUMENTS

| | | |
|---|---|---|
| JP | 2020-038495 | 3/2020 |
| JP | 2021-101465 | 7/2021 |
| WO | 2020/090848 | 5/2020 |
| WO | 2021/015134 | 1/2021 |

* cited by examiner

FIG.7

| | PRODUCTION CONDITION | | | ALLOY COMPOSITION | | | | PREDICTED CHARACTERISTIC | | |
|---|---|---|---|---|---|---|---|---|---|---|
| | TEMPERATURE [°C] | HEATING TIME [h] | ... | Si [MASS%] | Fe [MASS%] | Cu [MASS%] | ... | TENSILE STRENGTH [MPa] | 0.2% PROOF STRESS [MPa] | ... |
| 1 | | | | | | | | | | |
| 2 | | | | | | | | | | |
| ... | | | | | | | | | | |

MATERIAL DESIGN SUPPORT APPARATUS, MATERIAL DESIGN SUPPORT METHOD, AND PROGRAM

TECHNICAL FIELD

The present disclosure relates to a material design support apparatus, a material design support method, and a program.

BACKGROUND ART

In conventional design of metallic materials, in order to produce metallic materials with desired characteristics (tensile strength, hardness, toughness, plastic workability, and the like), component compositions of elements in metals and production conditions are determined empirically or by trial and error.

However, as the number of variable items increases in the component compositions of elements in metals and in the production conditions, the human and time burden of designing metallic materials has increased. In order to reduce the human and time burden described above, it has been proposed to design materials through optimization calculations and the like using a computer.

For example, in Patent Document 1, in order to reduce the increase in the computational load on the design of metallic materials, a design support method has been proposed, which includes: a search step of inputting a desired characteristic value in a database that is generated by using at least one mathematical model in which input information including a component composition of elements in metals and a production condition, and output information including a characteristic value of a metallic material, are related, and stores output data of the mathematical model in relation to input data for each mesh in which a range of inputs corresponding to the input information is separated by a plurality of sections, and retrieving a component composition of elements in metals and a production condition; and a presentation step of presenting the component composition of the elements in metals and the production condition corresponding to the desired characteristic value retrieved by the search step.

PRIOR ART DOCUMENT

Patent Document

Patent Document 1: Japanese Patent No. 6617842

DISCLOSURE OF THE INVENTION

Problem to be Solved by the Invention

However, when the number of dimensions of design conditions (the number of combinations of conditions) of materials is large, a large amount of calculation time and resources are required to optimize design conditions. Therefore, an efficient method for optimizing design conditions for materials is required.

One object of the present disclosure is to provide a material design support device, a material design support method, and a program for supporting efficient optimization of design conditions for materials.

Means of Solving the Problem

The present disclosure includes the following configurations.

[1] A material design support apparatus for supporting optimization of a design condition for a material, the material design support apparatus including:

a design condition setting unit configured to set a range of a design condition for a material;

a required characteristic setting unit configured to set a range of a required characteristic of the material;

an exhaustive prediction point generation unit configured to generate a plurality of exhaustive prediction points within the range of the design condition;

a prediction unit configured to input the exhaustive prediction points into a trained model in which a correspondence between a design condition for the material and a characteristic value of the material is learned, thereby to predict a characteristic value of the material; and a design condition adjustment unit configured to adjust, based on the predicted characteristic value of the material for each of the exhaustive prediction points and the range of the required characteristic of the material, a range of the design condition for the material in which a plurality of exhaustive prediction points are subsequently generated.

[2] The material design support apparatus according to [1], wherein the design condition adjustment unit is configured to extract, from the predicted characteristic value of the material for each of the exhaustive prediction points, a range of the design condition for the material that satisfies the range of the required characteristic of the material, and to narrow, based on the extracted range of the design condition for the material, the range of the design condition for the material in which the plurality of exhaustive prediction points are subsequently generated.

[3] The material design support apparatus according to [1] or [2], further including:

an information display unit configured to display: the range of the design condition for the material corresponding to the plurality of exhaustive prediction points that satisfies the range of the required characteristic of the material; and a range of predicted characteristic values of the material of the plurality of exhaustive prediction points that satisfies the range of the required characteristic of the material, wherein the design condition adjustment unit is configured to change, in response to a user operation to change the range of the required characteristic of the material that is displayed on the information display unit, the range of the design condition for the material.

[4] The material design support apparatus according to any one of [1] to [3], wherein the design condition adjustment unit is configured to repeat, until a range of the predicted characteristic value of the material of each of the plurality of exhaustive prediction points achieves a design objective, a process of adjusting the range of the design condition for the material in which the plurality of exhaustive prediction points are subsequently generated, the exhaustive prediction point generation unit is configured to regenerate a plurality of exhaustive prediction points within the range of the design condition for the material that is adjusted by the design condition adjustment unit, and the prediction unit is configured to input the regenerated exhaustive prediction points into the trained model, thereby to re-predict a characteristic value of the material.

[5] The material design support apparatus according to any one of [1] to [4], wherein the design condition for the material includes a composition and a production condition of the material.

[6] A material design support method executed by a computer for supporting optimization of a design condition for a material, the material design support method including:

a step of setting a range of a design condition for a material;

a step of setting a range of a required characteristic of the material;

a step of generating a plurality of exhaustive prediction points within the range of the design condition;

a step of inputting the exhaustive prediction points into a trained model in which a correspondence between a design condition for the material and a characteristic value of the material is learned, thereby predicting a characteristic value of the material; and a step of adjusting, based on the predicted characteristic value of the material for each of the exhaustive prediction points and the range of the required characteristic of the material, a range of the design condition for the material in which a plurality of exhaustive prediction points are subsequently generated.

[7] A program for causing a computer for supporting optimization of a design condition for a material, to execute:

a step of setting a range of a design condition for a material;

a step of setting a range of a required characteristic of the material;

a step of generating a plurality of exhaustive prediction points within the range of the design condition;

a step of inputting the exhaustive prediction points into a trained model in which a correspondence between a design condition for the material and a characteristic value of the material is learned, thereby predicting a characteristic value of the material; and a step of adjusting, based on the predicted characteristic value of the material for each of the exhaustive prediction points and the range of the required characteristic of the material, a range of the design condition for the material in which a plurality of exhaustive prediction points are subsequently generated.

Effects of the Invention

According to the present disclosure, it is possible to support efficient optimization of design conditions for materials.

BRIEF DESCRIPTION OF DRAWINGS

FIG. 7 is a configuration diagram illustrating an example of the design condition-material characteristic table.

MODE OF CARRYING OUT THE INVENTION

Next, embodiments of the present invention will be described in detail. The present invention is not limited to the following embodiments.

First Embodiment

<System Configuration>

Figure 1:
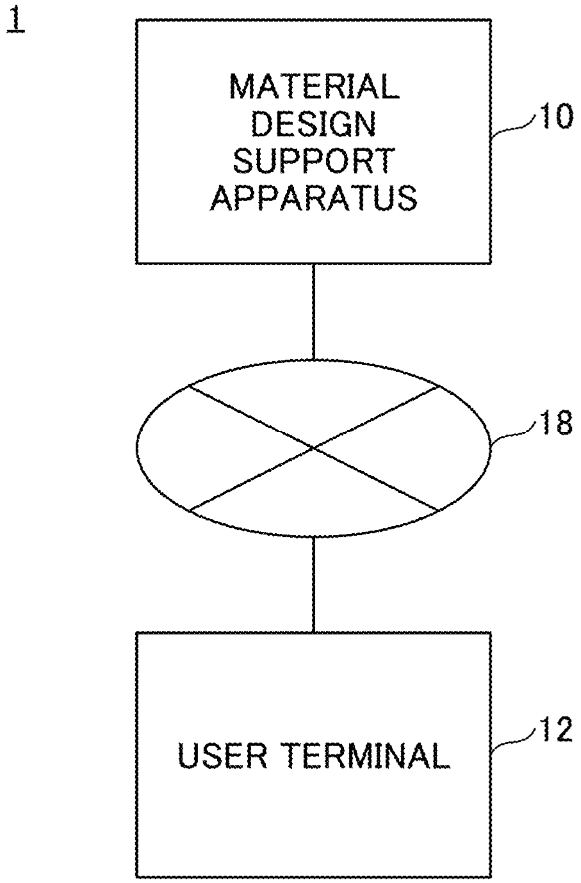
FIG. 1 is a configuration diagram illustrating an example of a material design support system according to one embodiment.

FIG. 1 is a configuration diagram illustrating an example of a material design support system according to one embodiment. A material design support system 1 of FIG. 1 includes a material design support apparatus 10 and a user terminal 12. The material design support apparatus 10 and the user terminal 12 are connected via a communication network 18, such as a local area network (LAN), the Internet, or the like, and are communicable with each other to perform data communication.

The user terminal 12 is an information processing terminal such as a PC, a tablet terminal, a smartphone, or the like, operated by a user such as a material designer. The user terminal 12 receives an input operation or a change operation of information necessary for optimizing a design condition for a material from the user, and causes the material design support apparatus 10 to execute the processing for supporting the optimization of the design condition for the material. The user terminal 12 receives the result of the processing for supporting the optimization of the design condition for the material executed by the material design support apparatus 10, and displays the result on a display device for checking by the user, for example.

The material design support apparatus 10 is an information processing apparatus such as a PC for executing the processing for supporting the optimization of the design condition for the material. The material design support apparatus 10 executes the processing for supporting the optimization of the design condition for the material using a trained model in which a correspondence between a design condition for a material and a characteristic value of the material is learned. The material design support apparatus 10 transmits the result of the executed processing for supporting the optimization of the design condition for the material to the user terminal 12.

The material design support system 1 illustrated in FIG. 1 is an example, and there are various system configuration examples depending on the application and purpose. For example, the material design support apparatus 10 may be implemented by a plurality of computers or may be implemented as a cloud computing service. The material design support system 1 illustrated in FIG. 1 may be implemented by a stand-alone computer.

<Hardware Configuration>

Figure 2:
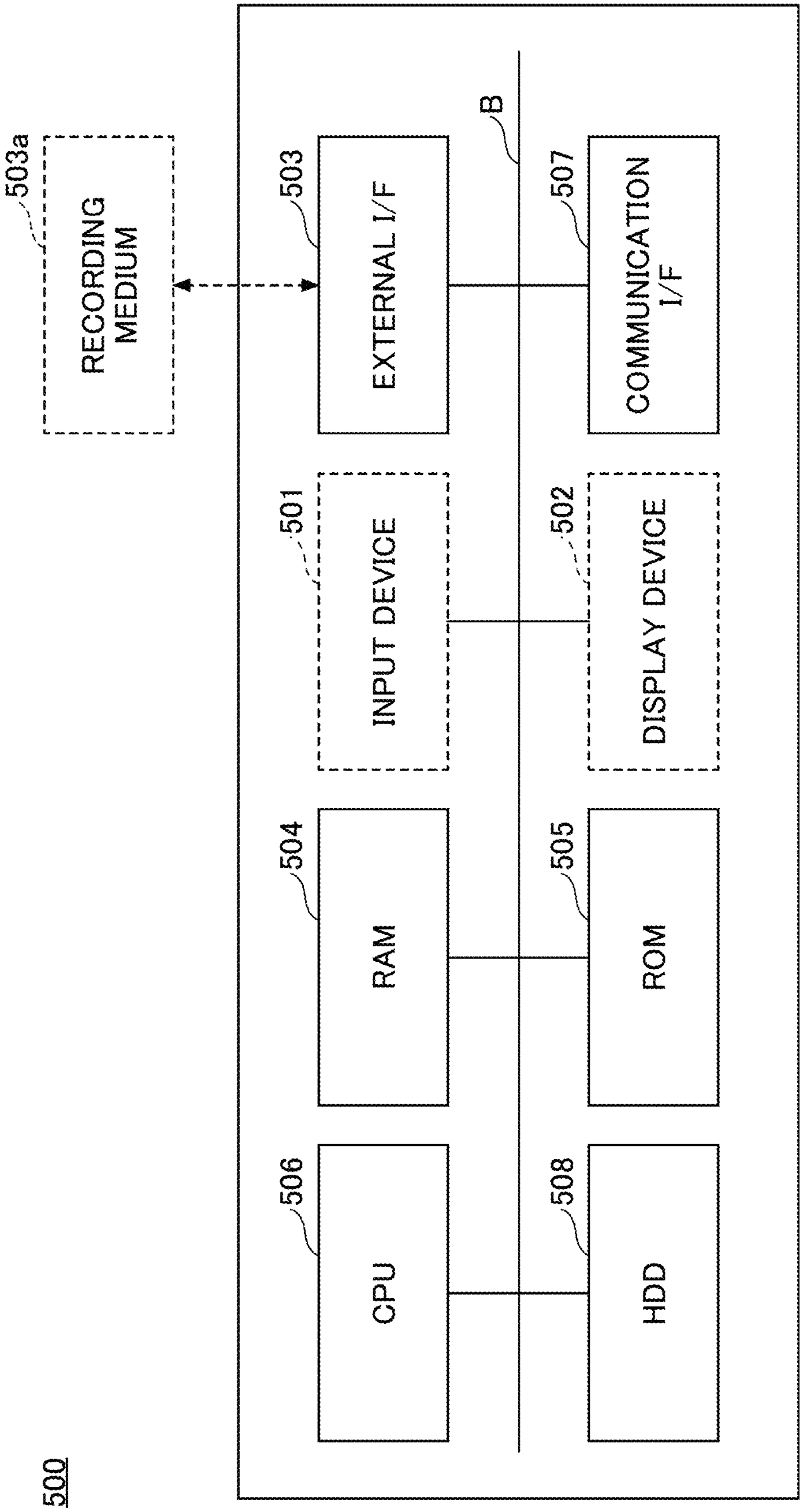
FIG. 2 is a hardware configuration diagram illustrating an example of a computer according to one embodiment.

The material design support apparatus 10 and the user terminal 12 illustrated in FIG. 1 are implemented in a computer 500 having a hardware configuration illustrated in FIG. 2, for example.

FIG. 2 is a hardware configuration diagram illustrating an example of the computer according to the one embodiment. The computer 500 of FIG. 2 includes an input device 501, a display device 502, an external I/F 503, a RAM 504, a ROM 505, a CPU 506, a communication I/F 507, a HDD 508, or the like, which are connected to each other via a bus B. The input device 501 and the display device 502 may be connected and used.

The input device 501 is a touchscreen panel, operation keys or buttons, a keyboard, a mouse, or the like used by the user to input various signals. The display device 502 includes a display, such as a liquid crystal display, an organic EL display, or the like for displaying a screen, a speaker for outputting sound data, such as voice, sound, or the like, and the like. The communication I/F 507 is an interface used by the computer 500 to perform the data communication.

In addition, the HDD 508 is an example of a non-volatile storage device that stores programs and data. The stored programs and data include an operating system (OS) that is basic software for controlling the entire computer 500, applications for providing various functions on the OS, or the like. The computer 500 may use a drive device (for example, a solid state drive (SSD) or the like) using a flash memory as a storage media, in place of the HDD 508.

The external I/F 503 is an interface provided with respect to an external device. Examples of the external device include a recording medium 503*a* or the like. Thus, the computer 500 can read from and/or write to the recording medium 503*a* via the external I/F 503. Examples of the recording medium 503*a* include a flexible disk, a CD, a DVD, an SD memory card, a USB memory, or the like.

The ROM 505 is an example of a non-volatile semiconductor memory (storage device) that can retain programs and data even when the power is turned off. The ROM 505 stores programs and data, such as a BIOS that is executed when the computer 500 is started, OS settings, network settings, or the like. The RAM 504 is an example of a volatile semiconductor memory (storage device) that temporarily stores the programs and data.

The CPU 506 is an arithmetic unit that reads the programs and data from a storage device, such as the ROM 505, the HDD 508, or the like into the RAM 504, and executes processing to control the entire computer 500 or implement functions thereof. The computer 500 according to the one embodiment implements various functions of the material design support apparatus 10 and of the user terminal 12, which will be described later, by executing programs.

<Functional Configuration>

Figure 3:
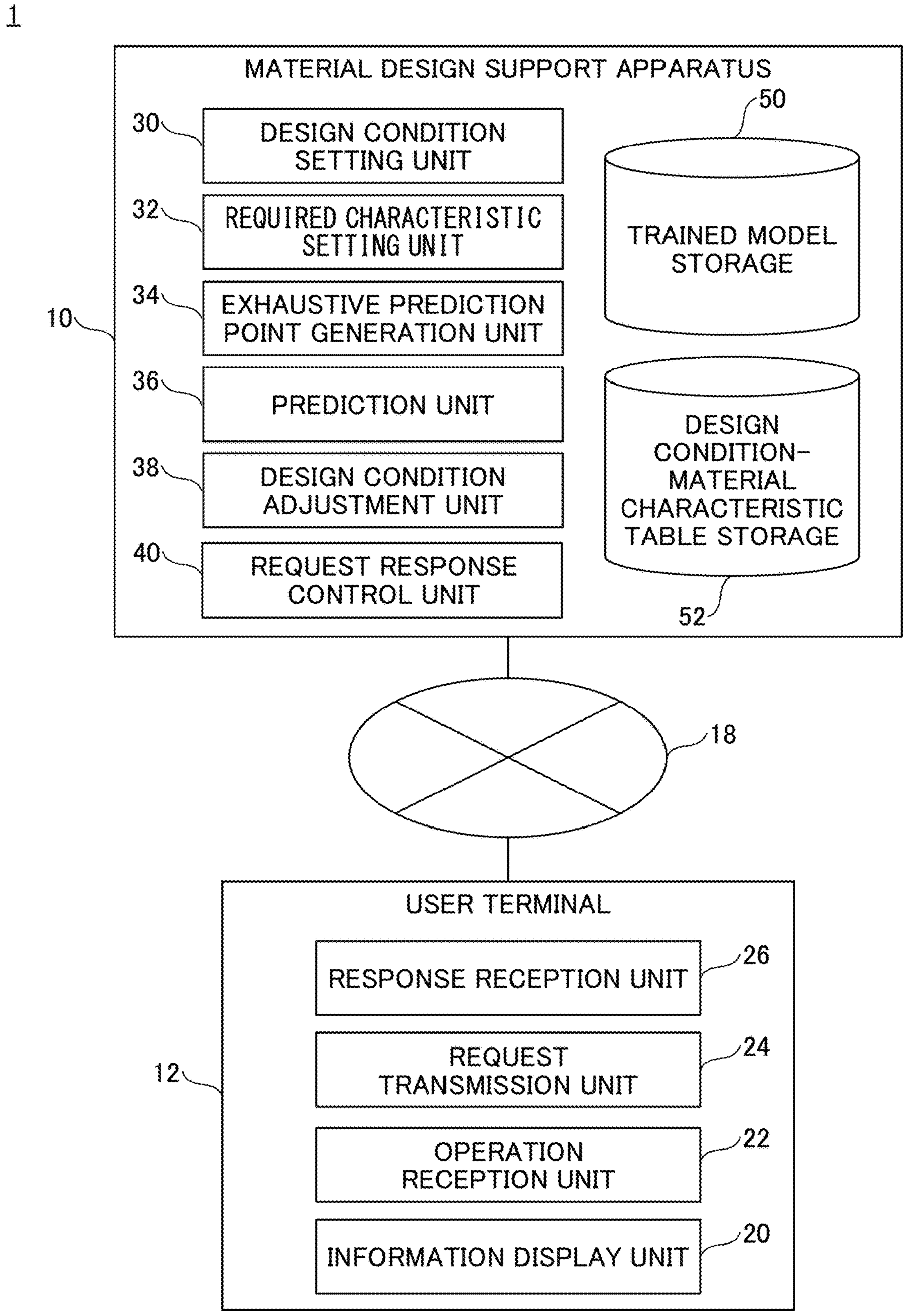
FIG. 3 is a functional configuration diagram illustrating an example of the material design support system according to one embodiment.

The configuration of the material design support system 1 according to the present embodiment will be described below. FIG. 3 is a functional configuration diagram illustrating an example of the material design support system according to the present embodiment. In the configuration diagram of FIG. 3, parts unnecessary for explaining the present embodiment are omitted as appropriate. In the present embodiment, the material for which optimization of the design condition is supported is called a design target material. The design target material is, for example, an aluminum alloy.

The material design support apparatus 10 of the material design support system 1 illustrated in FIG. 3 includes a design condition setting unit 30, a required characteristic setting unit 32, an exhaustive prediction point generation unit 34, a prediction unit 36, a design condition adjustment unit 38, a request response control unit 40, a trained model storage 50, and a design condition-material characteristic table storage 52. The user terminal 12 includes an information display unit 20, an operation reception unit 22, a request transmission unit 24, and a response reception unit 26.

The information display unit 20 displays information on the display device 502 or the like. For example, the information display unit 20 displays on the display device 502 a screen for receiving an input operation of information necessary for optimizing the design condition for the design target material, a screen for displaying the result of the processing for supporting the optimization of the design condition for the design target material, and the like. The operation reception unit 22 receives, from the user, the input operation or the change operation of information necessary for optimizing the design condition for the design target material. The request transmission unit 24 transmits a request for the processing for supporting the optimization of the design condition for the design target material, to the material design support apparatus 10. The response reception unit 26 receives a response to the request for the processing transmitted by the request transmission unit 24.

The design condition setting unit 30 sets a range of a design condition for an aluminum alloy, which is an example of a design target material. For example, the design condition setting unit 30 causes the user terminal 12 to display an input screen of the design condition for the user to set the range of the design condition. The design condition for the design target material includes the composition and the production condition of the design target material as information.

The required characteristic setting unit 32 sets a range of a required characteristic of the aluminum alloy, which is an example of the design target material. For example, the required characteristic setting unit 32 causes the user terminal 12 to display an input screen of the required characteristic for the user to set the range of the required characteristic.

The exhaustive prediction point generation unit 34 generates a plurality of exhaustive prediction points within the range of the set design condition for the design target material. For example, the exhaustive prediction point generation unit 34 calculates a plurality of numerical values, for each of the items such as the composition and the production condition included in the design condition for the design target material, at random or in predetermined increments within the range of the design condition for the design target material, and generates all combinations of the numerical values of the items as a plurality of exhaustive prediction points. The exhaustive prediction point generation unit 34 may adjust the time required for optimizing the design condition for the design target material by adjusting the number of exhaustive prediction points to be generated. The exhaustive prediction point generation unit 34 generates, for example, 10,000 exhaustive prediction points.

The prediction unit 36 reads a trained model from the trained model storage 50, inputs the plurality of exhaustive prediction points generated by the exhaustive prediction point generation unit 34 into the trained model, and predicts a characteristic value of the design target material for each of the plurality of exhaustive prediction points. The trained model storage 50 stores the trained model in which a correspondence between a design condition for a material such as an aluminum alloy and a characteristic value of the material have been previously acquired by machine learning and formulated.

As the trained model, a supervised training model such as a neural network or a Gaussian process may be applied. The trained model may be obtained by machine learning using training data that includes, for example, design conditions for a material such as an aluminum alloy read from a known material database and characteristic values of the material.

The design condition-material characteristic table storage 52 stores, in a design condition-material characteristic table described later, the characteristic value of the design target material for each of the exhaustive prediction points predicted by inputting the plurality of exhaustive prediction points into the trained model, in association with the exhaustive prediction point used for predicting the characteristic value. Thus, the design condition-material characteristic table storage 52 stores the design conditions (the exhaustive prediction points) of the design target material, which are inputs to the trained model, and the characteristic values (the predicted characteristic values) of the design target material, which are outputs from the trained model, in one data set in the same row of the design condition-material characteristic table.

The design condition adjustment unit 38 extracts a data set satisfying a range of the required characteristic of the design target material set by the required characteristic setting unit 32 from the design condition-material characteristic table storage 52, and displays an output screen of the range of the design condition satisfying the range of the required characteristic on the user terminal 12 for checking by the user.

The design condition adjustment unit 38 displays, by using a data set satisfying the range of the required characteristic of the design target material extracted from the design condition-material characteristic table storage 52, an output screen of the range of the predicted characteristic value of the design target material satisfying the range of the required characteristic on the user terminal 12 for checking by the user.

The design condition adjustment unit 38 may change, in response to a user operation to change the range of the required characteristic of the design target material, the display of the range of the design condition satisfying the range of the required characteristic displayed on the user terminal 12.

Accordingly, the design condition adjustment unit 38 can extract the range of the design condition that simultaneously satisfies the multidimensional required characteristic, by receiving the operation to set a range of the multidimensional required characteristic from the user. The design condition adjustment unit 38 can adjust the range of the design condition that simultaneously satisfies the multidimensional required characteristic by receiving the operation to change the range of the multidimensional required characteristic from the user.

For example, the design condition adjustment unit 38 may narrow the range of the design condition by receiving the operation to change the required characteristic in the direction to be increased from the user. The design condition adjustment unit 38 may expand the range of the design condition by receiving the operation to change the required characteristic in the direction to be decreased from the user.

Further, the design condition adjustment unit 38 may narrow the range of the design condition for the design target material used for generating the previous exhaustive prediction points, to the range of the design condition that satisfies the range of the required characteristic of the design target material, as the range of the design condition used for subsequently generating the exhaustive prediction points. The design condition adjustment unit 38 can narrow the design space of the design target material, by narrowing the range of the design condition of the design target material used for generating the exhaustive prediction points to the range of the design condition that satisfies the range of the required characteristic of the design target material. The design condition adjustment unit 38 can obtain a more precise range of design conditions by regenerating the exhaustive prediction points within the narrowed range of the design condition and re-predicting the characteristic value of the design target material.

The request response control unit 40 controls a process of receiving a request from the user terminal 12 and returning a response to the request to the user terminal 12. For example, the request response control unit 40 receives a request for the processing for supporting the optimization of the design condition of the design target material from the user terminal 12 and transmits a response to the received request for the processing to the user terminal 12.

<Processing>

Figure 4:
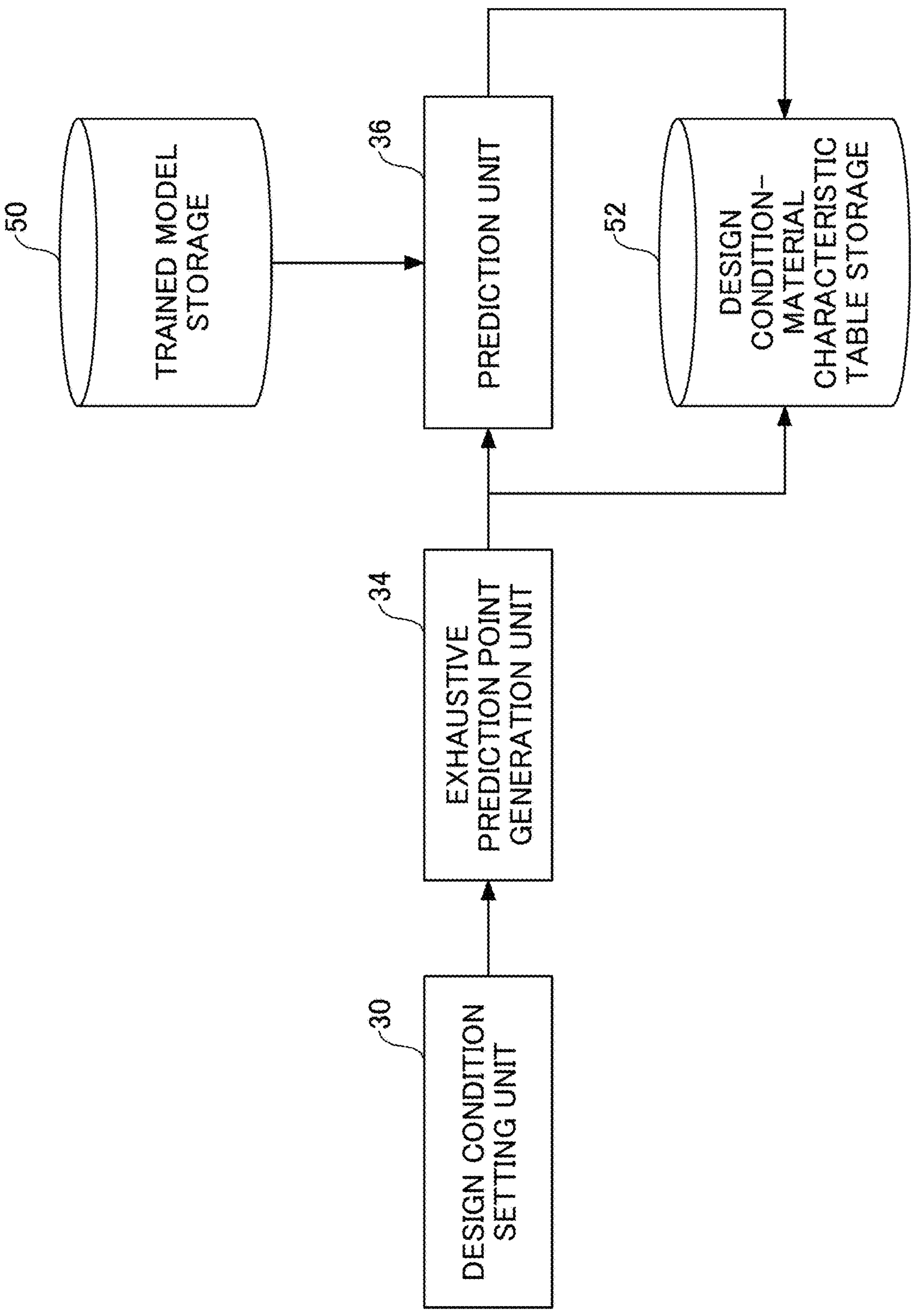
FIG. 4 is an explanatory diagram illustrating an example of a process of storing a design condition-material characteristic table of the material design support system in a design condition-material characteristic table storage according to one embodiment.
Figure 5:
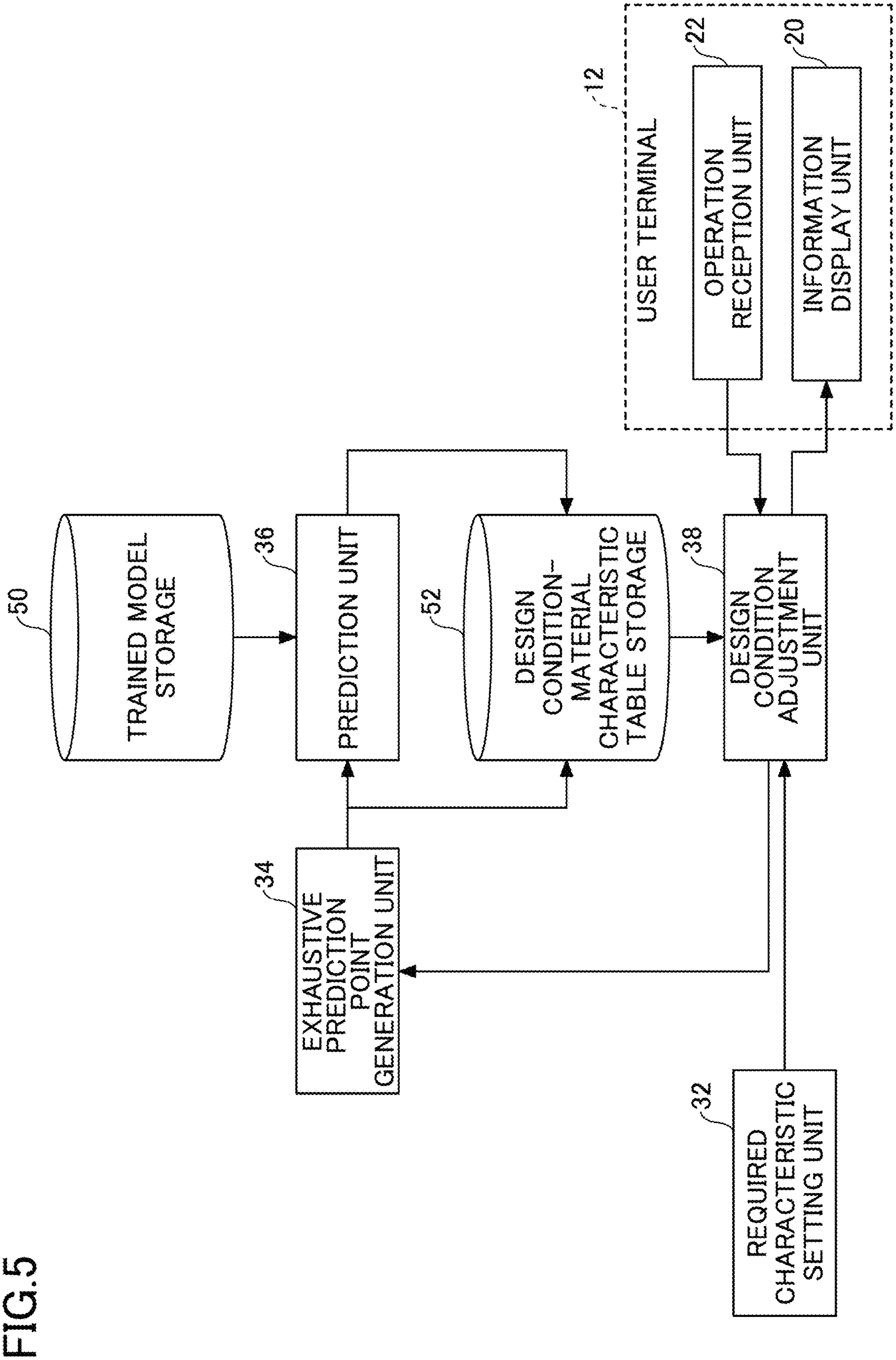
FIG. 5 is an explanatory diagram illustrating an example of a process of narrowing design conditions using the design condition-material characteristic table of the material design support system according to one embodiment.

The processing by the material design support system 1 according to the present embodiment will be described. FIG. 4 is an explanatory diagram illustrating an example of a process of storing the design condition-material characteristic table of the material design support system according to the present embodiment in the design condition-material characteristic table storage. FIG. 5 is an explanatory diagram illustrating an example of a process of narrowing the design conditions using the design condition-material characteristic table of the material design support system according to the present embodiment. In the following, an example of 6061 alloy, an example of 6000 series aluminum alloy, will be described as the design target material.

Figure 6:
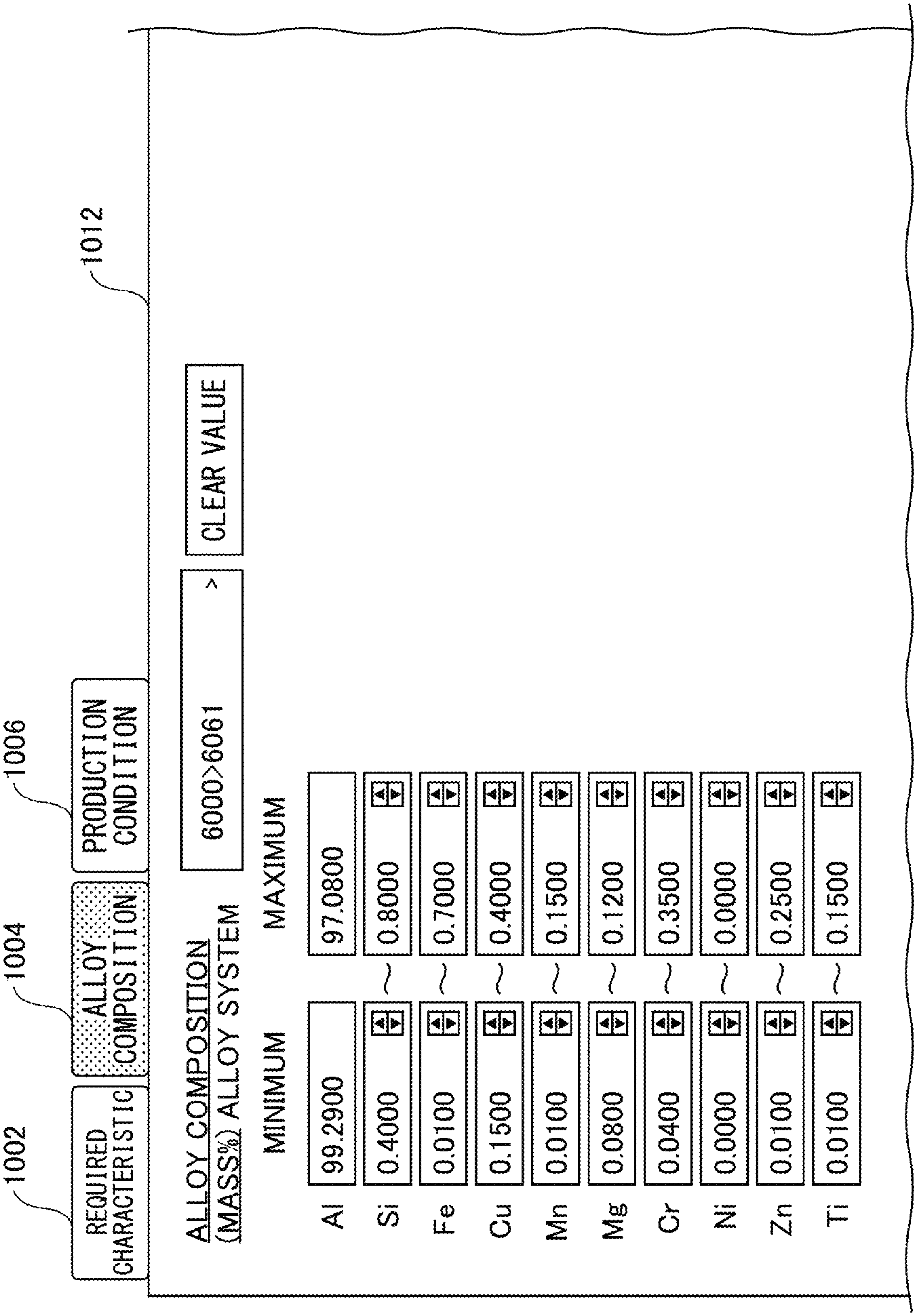
FIG. 6 is an image diagram illustrating an example of an input screen.

The design condition setting unit 30 of FIG. 4 causes the user terminal 12 to display an input screen 1012 as illustrated in FIG. 6 for the user to set a range of the design condition for the design target material. FIG. 6 is an image diagram of an example of the input screen. In the input screen 1012 of FIG. 6, a display page is switched by a selection operation of tabs 1002 to 1006. By the selection operation of the tab 1002, the input screen 1012 is switched to a display page for the user to set a range of the required characteristic of the design target material. By the selection operation of the tab 1004, the input screen 1012 is switched to a display page for the user to set a range of the composition among the design conditions for the design target material. By the selection operation of the tab 1006, the input screen 1012 is switched to a display page for the user to set a range of the production condition among the design conditions for the design target material.

The input screen 1012 of FIG. 6 is an example of the display page for the user to set the range of the composition among the design conditions for the design target material. FIG. 6 illustrates an example of the display page for the user to set the minimum and maximum values of the items related to the composition among the design conditions for the design target material. The items related to the composition include, for example, elemental species such as Si, Fe, Cu, Mn, Mg, Cr, Ni, Zn, and Ti as additives in mass percentage (mass). The mass percentage of Al is expressed by "100%−(sum of the mass percentages of the above elements)".

The display page switched by the selection operation of the tab 1006 is a display page for the user to set the range of the production condition among the design conditions for the design target material. For example, the minimum and maximum values of items related to the production condition are to be set. Examples of the items of the production condition include: temperature (° C.) and time (h) for each process such as annealing, solution annealing, artificial age hardening, natural aging, hot working, cold working, stabilization, homogenization, and the like as items related to heat treatment; and processing rate, pressing ratio, surface reduction ratio, product shape, and the like as items related to processing conditions.

Details of the display page that is switched by the selection operation of the tab 1002 for the user to set the range of the required characteristic of the design target material will be described later.

Returning to FIG. 4, the design condition setting unit 30 receives settings from the user for the range of the design condition for the 6061 alloy. The exhaustive prediction point generation unit 34 generates a plurality of exhaustive prediction points within the range of the design condition for the 6061 alloy of which the settings are received from the user by the design condition setting unit 30. Here, the case will be described in which the range of mass percentage of Si in the item related to the composition and the range of annealing time in the item related to the production condition are set.

The exhaustive prediction point generation unit 34 calculates a plurality of numerical values at random for each item within the range of mass percentage of Si in the item related to the composition and the range of annealing time in the item related to the production condition. The exhaustive prediction point generation unit 34 generates all combinations of the plurality of numerical values for each item and outputs them as exhaustive prediction points.

The prediction unit 36 reads the trained model from the trained model storage 50, inputs the plurality of exhaustive prediction points generated by the exhaustive prediction point generation unit 34 into the trained model, and predicts the characteristic value of the 6061 alloy for each of the plurality of exhaustive prediction points. The trained model storage 50 stores the trained model in which the correspondence between input information including design conditions for the 6061 alloy and characteristic values of the 6061 alloy have been previously acquired by machine learning and formulated.

Examples of the items of the characteristic value include tensile strength, 0.2% proof stress, elongation, coefficient of linear expansion, Young's modulus, Poisson's ratio, fatigue strength, hardness, creep property, shear strength, Charpy impact value, specific heat, thermal conductivity, electrical resistivity, density, solidus, liquidus, and the like. Examples of the fatigue strength include tensile strength of a material after repeated loading tests (repeated tensile compression and the like) for 10 million cycles, and the stress value is used as the characteristic value.

The prediction unit 36 inputs the exhaustive prediction points generated by the exhaustive prediction point generation unit 34 into the trained model and stores the predicted characteristic value (output) of the 6061 alloy, in association with the exhaustive prediction points (input), in the design condition-material characteristic table storage 52. FIG. 7 is a configuration diagram of an example of the design condition-material characteristic table. As illustrated in FIG. 7, the design condition-material characteristic table is stored in the same row of the design condition-material characteristic table storage 52, in which inputs to the trained model (the production condition and alloy composition) and outputs from the trained model (the predicted characteristic) are combined as one data set. Each row of the design condition-material characteristic table is an individual data set. Each column of the design condition-material characteristic table stores the numerical values of each item of input and output of the trained model.

As illustrated in FIG. 4, the material design support system 1 according to the present embodiment can generate a group of data sets of a plurality of design conditions (the exhaustive prediction points) within the range of the design condition for the 6061 alloy and characteristic values predicted using the trained model, by performing an operation for setting (specifying) the range of the design condition for the 6061 alloy by a user.

Figure 8:
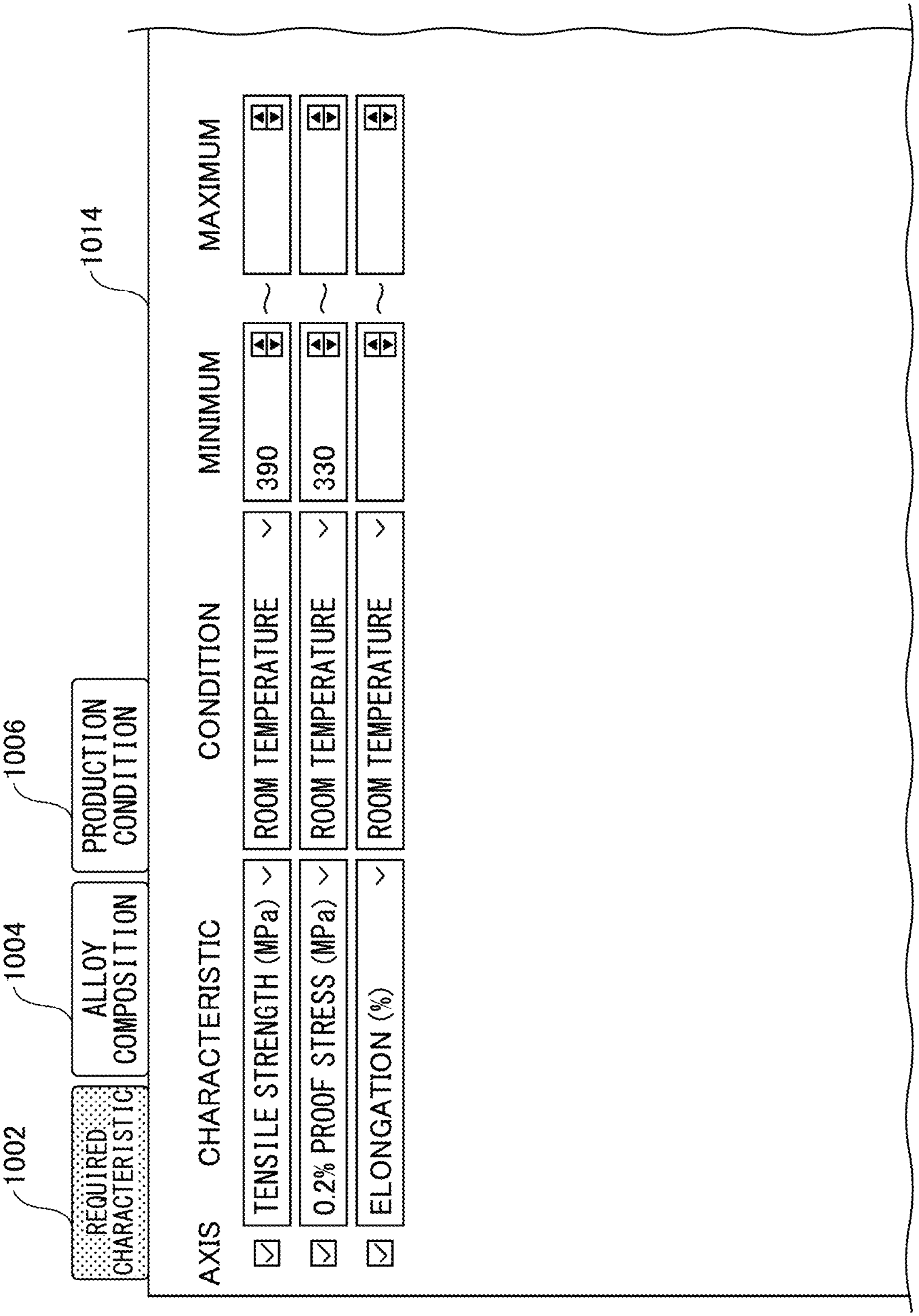
FIG. 8 is an image diagram illustrating an example of an input screen.

The required characteristic setting unit 32 of FIG. 5 causes the user terminal 12 to display an input screen 1014 as illustrated in FIG. 8, for example, for the user to set the range of the required characteristic of the 6061 alloy. FIG. 8 is an image diagram of an example of the input screen. The input screen 1014 of FIG. 8 is an example of a display page switched by the selection operation of the tab 1002.

FIG. 8 illustrates an example of a display page for setting the request characteristic. Because the items of the request characteristic are the same as the items of the characteristic value described above, description thereof is omitted. In the example of FIG. 8, "tensile strength" and "0.2% proof stress" are set as the items of the request characteristic. In the example illustrated in FIG. 8, "390 MPa or more" is set as the range of the item "tensile strength" of the required characteristic. In the example illustrated in FIG. 8, "330 MPa or more" is set as the range of the item "0.2% proof strength" of the required characteristic.

The design condition adjustment unit 38 extracts a data set from the design condition-material characteristic table storage 52, and by using the data set, displays an output screen as described later on the user terminal 12 for checking by the user.

Figure 9:
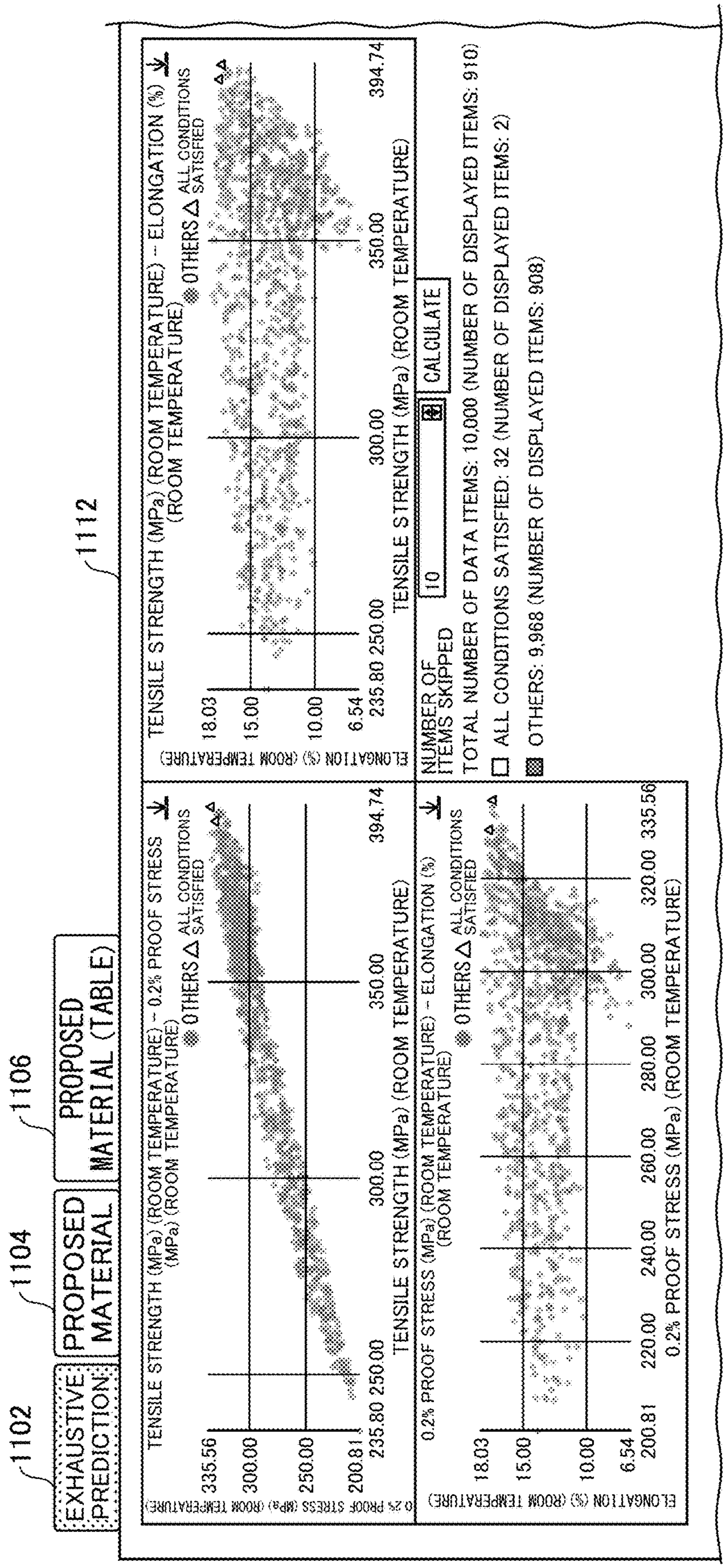
FIG. 9 is an image diagram illustrating an example of an output screen.

FIG. 9 is an image diagram of an example of the output screen. In an output screen 1112 illustrated in FIG. 9, a display page is switched by a selection operation of tabs 1102 to 1106. By the selection operation of the tab 1102, the output screen 1112 is switched to a display page illustrated in FIG. 9 in which each point of the exhaustive prediction points is plotted on three two-dimensional coordinate systems having any two axes of "tensile strength", "0.2% proof strength", and "elongation". In the output screen 1112 illustrated in FIG. 9, the exhaustive prediction points satisfying the range of the required characteristic of the 6061 alloy set by the required characteristic setting unit 32 are plotted with a triangle "A", and the exhaustive prediction points not satisfying the range of the required characteristic of the 6061 alloy set by the required characteristic setting unit 32 are plotted with a circle "●".

By checking the output screen 1112 of FIG. 9, the user can check the number of exhaustive prediction points that satisfy the range of the required characteristic of the 6061 alloy set by the required characteristic setting unit 32 among the plurality of exhaustive prediction points generated by the exhaustive prediction point generation unit 34.

Figure 10:
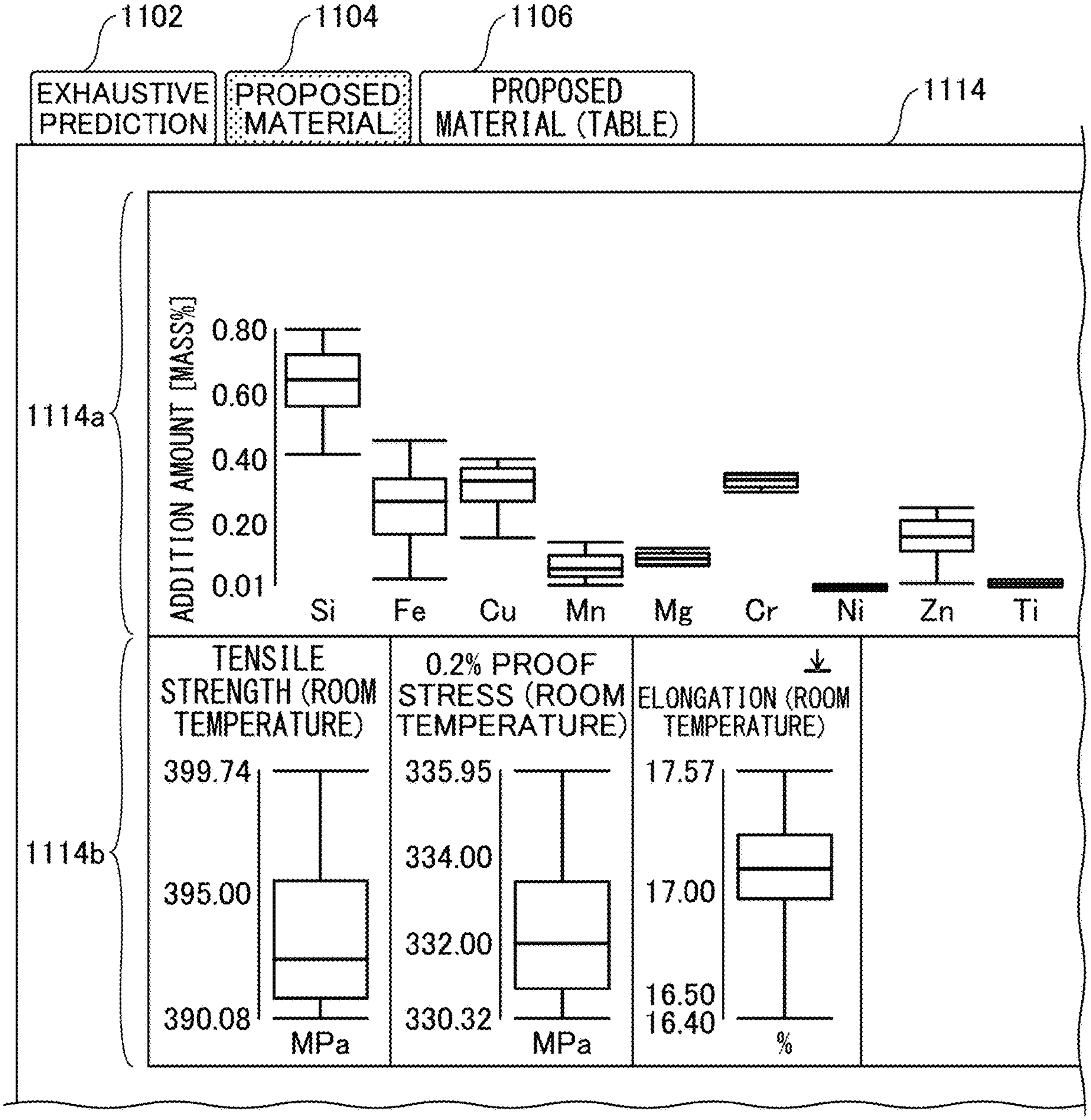
FIG. 10 is an image diagram illustrating an example of an output screen.

By the selection operation of the tab 1104, the output screen 1112 of FIG. 9 changes to an output screen 1114 of FIG. 10. FIG. 10 is an image diagram of an example of the output screen. In the output screen 1114 illustrated in FIG. 10, an upper part 1114*a* illustrates a box-and-whisker diagram of the range of the composition satisfying the range of the required characteristic of the 6061 alloy. In FIG. 10, a lower part 1114*b* illustrates a box-and-whisker diagram of the range of the predicted characteristic value satisfying the range of the required characteristic of the 6061 alloy.

For example, in the box-and-whisker diagram in the lower part 1114*b*, three bars indicate the maximum, median, and minimum values of the range of the predicted characteristic value satisfying the range of the required characteristic of the 6061 alloy, the lower end of the box indicates the first quantile, and the upper end of the box indicates the third quantile.

By checking the output screen 1114 of FIG. 10, the user can extract the exhaustive prediction point satisfying the range of the required characteristic of the 6061 alloy set by the required characteristic setting unit 32 out of the plurality of exhaustive prediction points generated by the exhaustive prediction point generation unit 34, and check the range of the composition and the range of the predicted characteristic value corresponding to the exhaustive prediction point.

For example, in the example of the output screen 1114 illustrated in FIG. 10, the user can see that the maximum value of tensile strength predicted as one of the characteristic values of the 6061 alloy is "399.74", the maximum value of 0.2% proof stress predicted as one of the characteristic values of the 6061 alloy is "335.95", and the maximum value of elongation predicted as one of the characteristic values of the 6061 alloy is "17.57".

By the selection operation of the tab 1106, the output screen 1112 illustrated in FIG. 9 or the output screen 1114 illustrated in FIG. 10 may change to an output screen that includes a table presenting the range of the composition satisfying the range of the required characteristic of the 6061 alloy, or presenting the composition, the production condition, and the predicted characteristic value of each of the exhaustive prediction points.

Figure 11:
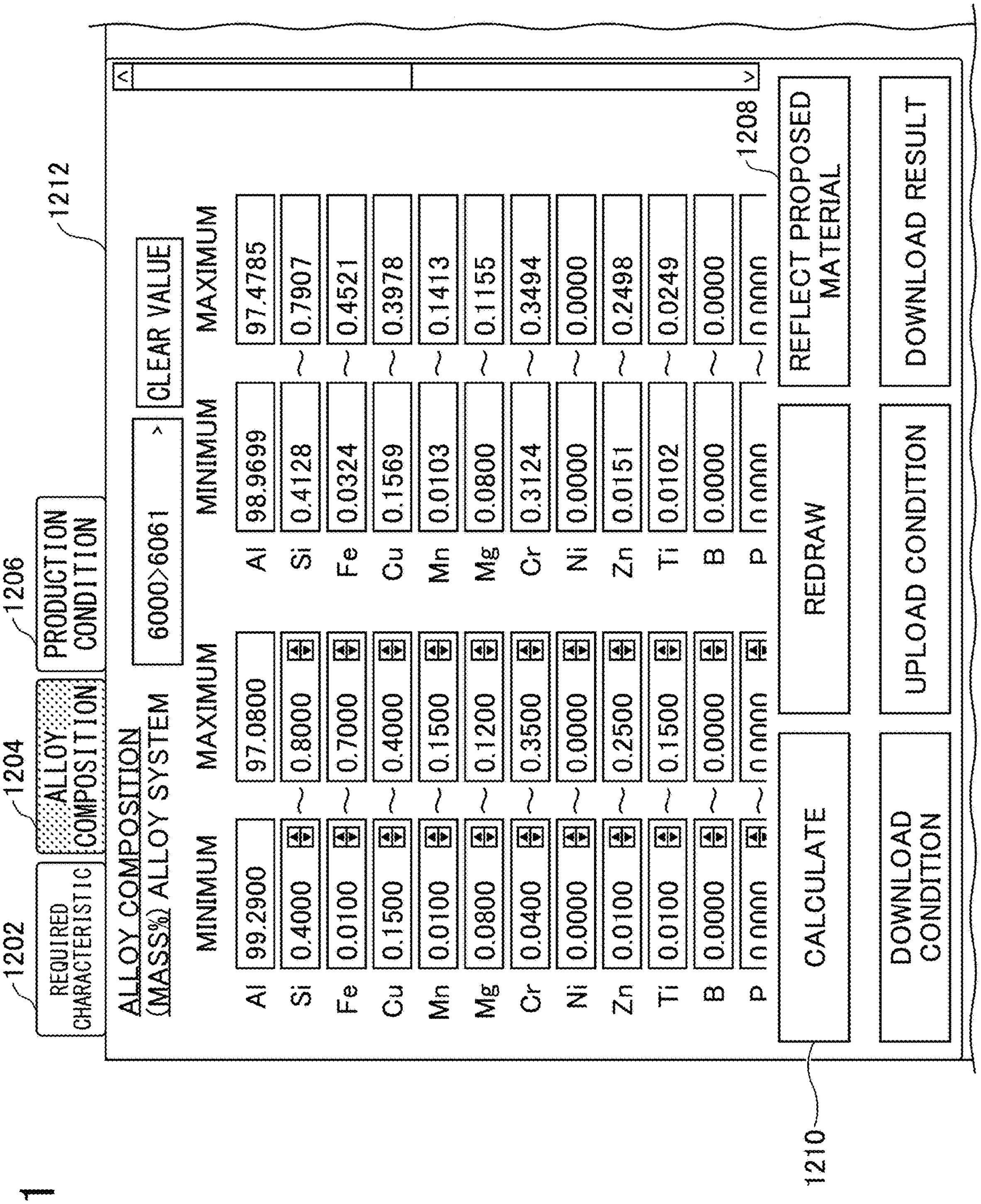
FIG. 11 is an image diagram illustrating an example of an input screen.

When the user terminal 12 displaying the output screen such as the output screen 1112 illustrated in FIG. 9 or the output screen 1114 illustrated in FIG. 10 receives a user operation to change to the input screen, the design condition adjustment unit 38 displays an input screen 1212 illustrated in FIG. 11, for example, to the user terminal 12 and proposes a narrowed range of the design condition of the 6061 alloy to the user.

FIG. 11 is an image diagram of an example of the input screen. In the input screen 1212 of FIG. 11, the range of the design condition set by the user is illustrated on the left side, and the range of the design condition (a proposed material) in which the range of the design condition set by the user is narrowed is illustrated on the right side. In the input screen 1212 of FIG. 11, the display page is switched by the selection operation of tabs 1202 to 1206. By the selection operation of the tab 1202, the input screen 1212 is switched to a display page for the user to reset the range of the required characteristic of the 6061 alloy. By the selection operation of the tab 1204, the input screen 1212 is switched to a display page for the user to reset the range of the composition among the design conditions for the 6061 alloy. By the selection operation of the tab 1206, the input screen 1212 is switched to a display page for the user to reset the range of the production condition among the design conditions for the 6061 alloy.

The design condition adjustment unit 38 extracts, for example, an exhaustive prediction point that satisfies the range of the required characteristic of the 6061 alloy set by the required characteristic setting unit 32, and narrows the range of the design condition based on the extracted exhaustive prediction point.

For example, the design condition adjustment unit 38 proposes the range of the design condition corresponding to the exhaustive prediction point that satisfies the range of the required characteristic to the user, as the narrowed range of the design condition. The design condition adjustment unit 38 may expand, by a predetermined percentage, the range of the design condition corresponding to the exhaustive prediction point that satisfies the range of the required characteristic, and propose the expanded range of the design condition to the user, as the narrowed range of the design condition.

Figure 12:
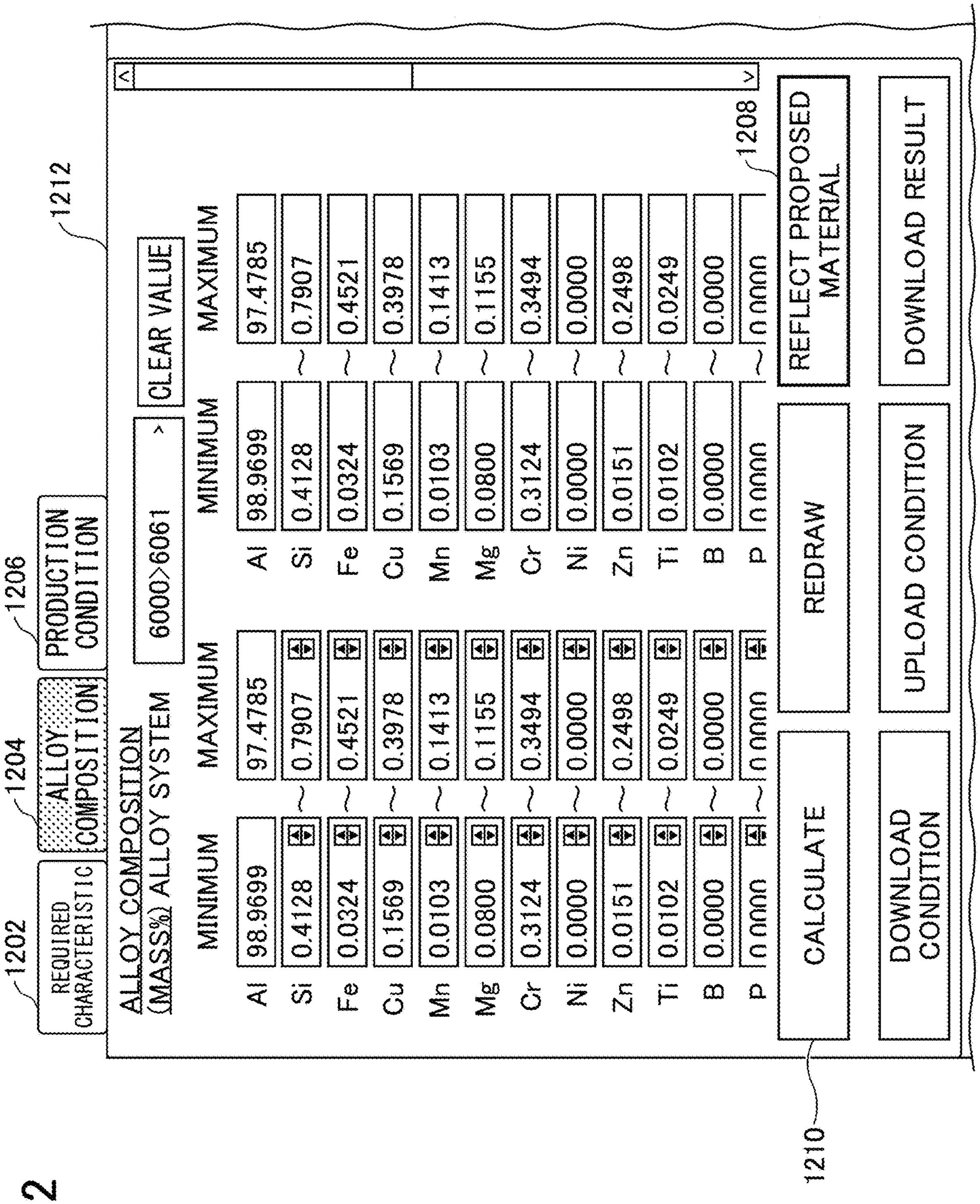
FIG. 12 is an image diagram illustrating an example of an input screen.

By performing a selection operation such as pressing a "reflect proposed material" button 1208 on the input screen 1212 of FIG. 11, the user can transfer the narrowed range of the design condition for the 6061 alloy displayed on the right side to the range of the design condition on the left side, as illustrated in FIG. 12. FIG. 12 is an image diagram of an example of the input screen.

By performing a selection operation such as pressing a "calculate" button 1210 on the input screen 1212 of FIG. 12, the user can regenerate the exhaustive prediction points from the narrowed range of the design condition for the 6061 alloy and can re-predict the characteristic value of the 6061 alloy for each of the regenerated exhaustive prediction points.

When the exhaustive prediction point generation unit 34 of FIG. 5 receives the information of the narrowed range of the design condition for the 6061 alloy from the design condition adjustment unit 38, the exhaustive prediction point generation unit 34 regenerates the exhaustive prediction points from the narrowed range of the design condition for the 6061 alloy. The prediction unit 36 inputs the plurality of exhaustive prediction points regenerated from the narrowed range of the design condition for the 6061 alloy to the trained model, and re-predicts the characteristic value of the 6061 alloy for each of the regenerated exhaustive prediction points.

The design condition-material characteristic table storage 52 restores the characteristic value of the 6061 alloy for each of the re-predicted exhaustive prediction points in the design condition-material characteristic table, in association with the exhaustive prediction point used for the re-prediction of the characteristic value.

Figure 13:
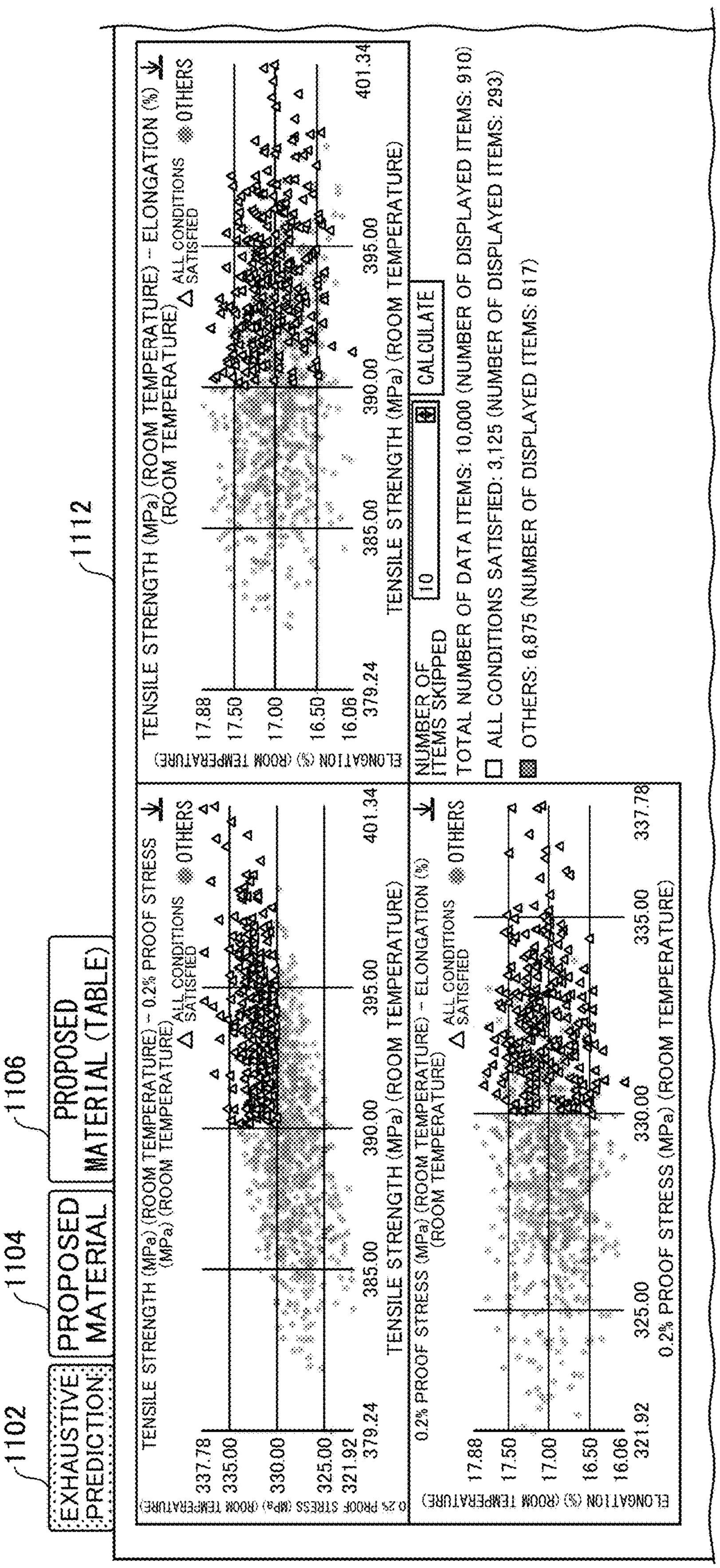
FIG. 13 is an image diagram illustrating an example of an output screen.

The design condition adjustment unit 38 extracts a data set from the design condition-material characteristic table storage 52, and by using the data set, displays an output screen as illustrated in FIG. 13 on the user terminal 12 for checking by the user.

FIG. 13 is an image diagram of an example of the output screen. In the output screen 1112 illustrated in FIG. 13, as in the output screen 1112 illustrated in FIG. 9, the display page is switched by the selection operation of the tabs 1102 to 1106. For example, by the selection operation of the tab 1102, the output screen 1112 is switched to the display page illustrated in FIG. 13 in which each point of the exhaustive prediction points is plotted in three two-dimensional coordinate systems having any two axes of "tensile strength", "0.2% proof strength", and "elongation".

In the output screen 1112 illustrated in FIG. 13, as in FIG. 9, the exhaustive prediction points satisfying the range of the required characteristic of the 6061 alloy set by the required characteristic setting unit 32 are plotted with a triangle "A", and the exhaustive prediction points not satisfying the range of the required characteristic of the 6061 alloy set in the required characteristic setting unit 32 are plotted with a circle "●".

By checking the output screen 1112 of FIG. 13, the user can see that the number of exhaustive prediction points that satisfy the range of the required characteristic of the 6061 alloy set by the required characteristic setting unit 32 has increased from before narrowing the range of the design condition for the 6061 alloy.

Figure 14:
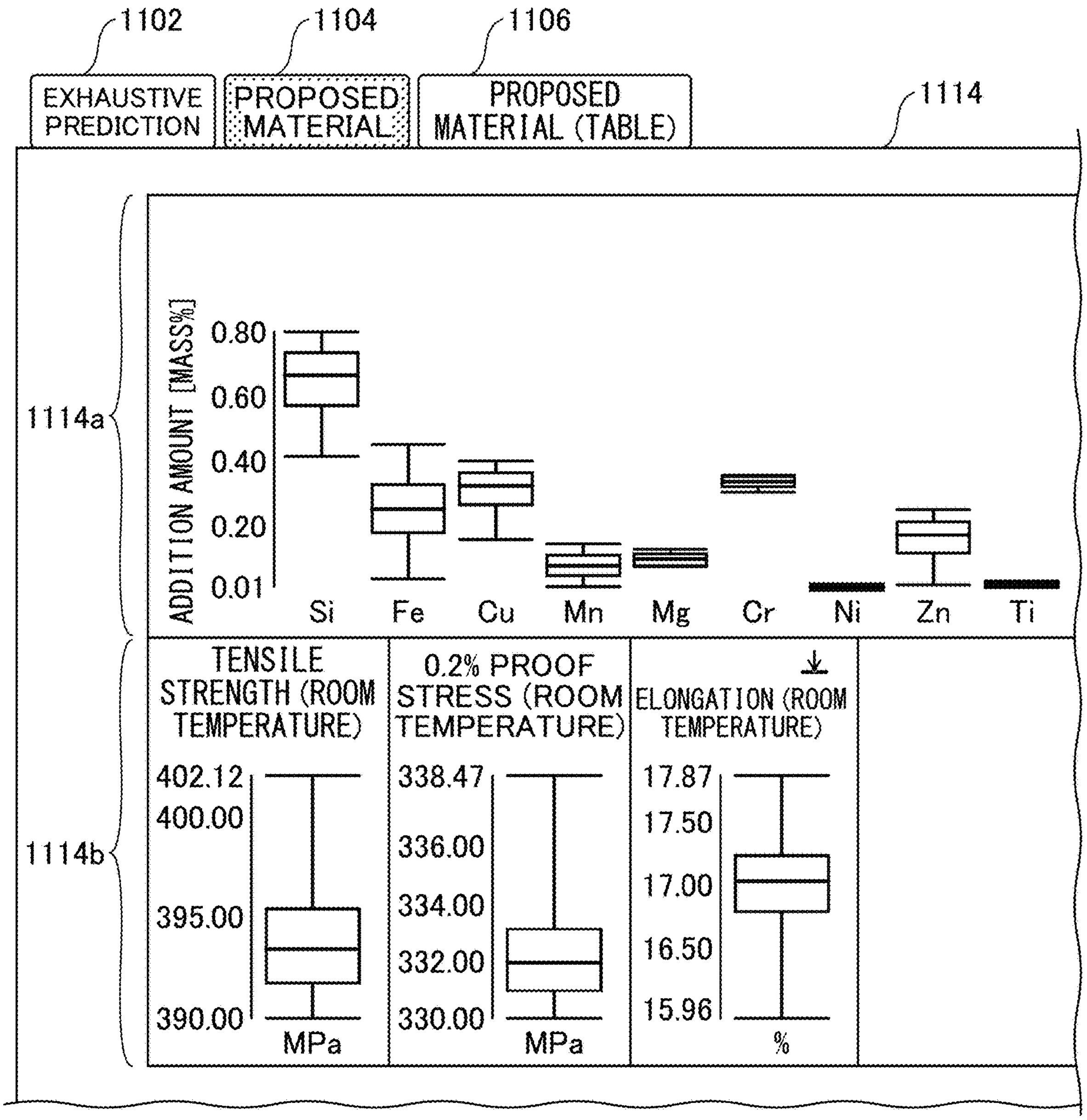
FIG. 14 is an image diagram illustrating an example of an output screen.

By the selection operation of the tab 1104 illustrated in FIG. 13, the output screen 1112 illustrated in FIG. 13 changes to the output screen 1114 illustrated in FIG. 14. FIG. 14 is an image diagram of an example of the output screen. In the output screen 1114 illustrated in FIG. 14, the upper part 1114*a* illustrates a box-and-whisker diagram of the range of the composition satisfying the range of the required characteristic of the 6061 alloy. In FIG. 14, the lower part 1114*b* illustrates a box-and-whisker diagram of the range of the re-predicted characteristic value satisfying the range of the required characteristic of the 6061 alloy.

By checking the output screen 1114 of FIG. 14, the user can re-extract the exhaustive prediction point satisfying the range of the required characteristic of the 6061 alloy set by the required characteristic setting unit 32 among the plurality of exhaustive prediction points regenerated by the exhaustive prediction point generation unit 34, and check the range of the re-predicted characteristic value corresponding to the exhaustive prediction point.

For example, in the example of the output screen 1114 of FIG. 14, the maximum value of tensile strength predicted as one of the characteristic values of the 6061 alloy increases from "399.74" to "402.12". In the example of the output screen 1114 of FIG. 14, the maximum value of 0.2% proof stress predicted as one of the characteristic values of the 6061 alloy increases from "335.95" to "338.47". In the example of the output screen 1114 of FIG. 14, the maximum value of elongation predicted as one of the characteristic values of the 6061 alloy increases from "17.57" to "17.87".

Figure 15:
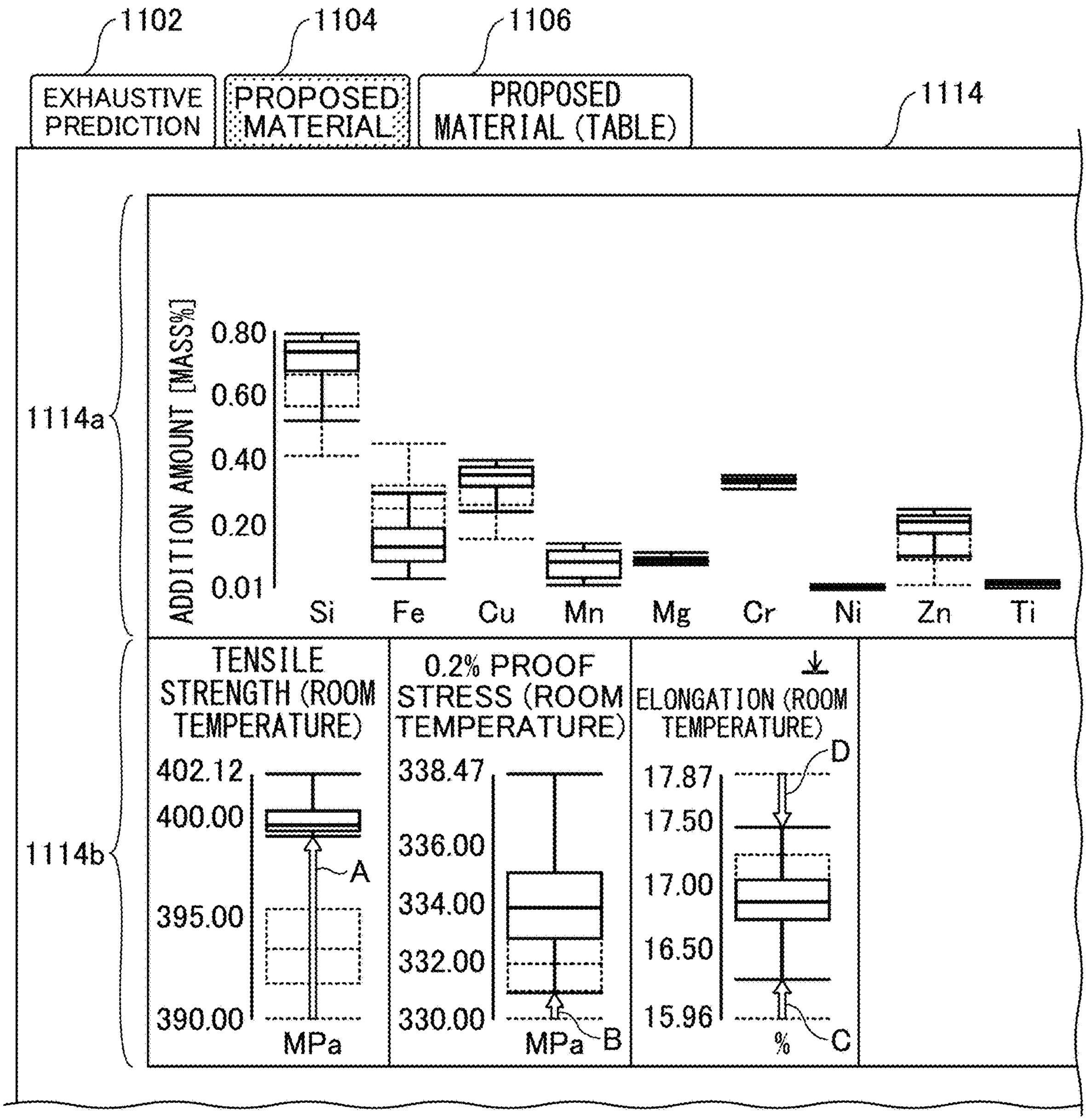
FIG. 15 is an image diagram illustrating an example of an output screen.

The user can adjust the range of the required characteristic as illustrated in FIG. 15, for example, via the output screen 1114 of FIG. 14 displayed on the user terminal 12. FIG. 15 is an image diagram of an example of the output screen. In the output screen 1114, for example, as illustrated in FIG. 15, a user operation for changing the range of the required characteristic of the 6061 alloy is received from the box-and-whisker diagram of the lower part 1114*b*.

In the output screen 1114 of FIG. 15, as illustrated by an arrow A, an operation for increasing the lower limit value of the tensile strength, which is an example of the required characteristic, from "390.00" to "399.00" is received from the user of the user terminal 12. For example, in the output screen 1114 of FIG. 15, an operation for increasing the lower limit value of the tensile strength, which is an example of the required characteristic, may be received from the user by moving the bar indicating the minimum value of the box-and-whisker diagram in the lower part 1114*b* upward.

The operation for increasing the lower limit value of the tensile strength, which is an example of the required characteristic, may be an operation for extracting the upper data (such as the data of the upper 2.5%) among the tensile strengths of the plurality of exhaustive prediction points predicted as one of the characteristic values of the 6061 alloy.

The output screen 1114 of FIG. 15 is an example of an operation for increasing the lower limit value of the 0.2% proof strength, which is an example of the required characteristic, received from the user of the user terminal 12, as indicated by an arrow B. The output screen 1114 illustrated in FIG. 15 is an example in which an operation to raise the lower limit of elongation, which is an example of the required characteristic, as indicated by an arrow C, and an operation to lower the upper limit of elongation, which is an example of the required characteristic, as indicated by an arrow D, are received from the user of the user terminal 12.

When the output screen 1114 illustrated in FIG. 15 receives the user operation to change the upper limit and the lower limit of the required characteristic, as indicated by the arrows A to D, the range of the composition that satisfies the range of the required characteristic of the 6061 alloy displayed in the box-and-whisker diagram in the upper part 1114*a* is changed in accordance with the change of the range of the required characteristic.

When the output screen 1114 illustrated in FIG. 15 receives the user operation to change the upper limit and the lower limit of the required characteristic, both the state before the user operation is received and the state after the user operation is received may be displayed in different display formats (different colors, different concentrations, and the like).

Thus, while adjusting the range of the required characteristic of the 6061 alloy, the user can narrow the range of the design condition for the 6061 alloy to satisfy the range of the required characteristic of the 6061 alloy.

Figure 16:
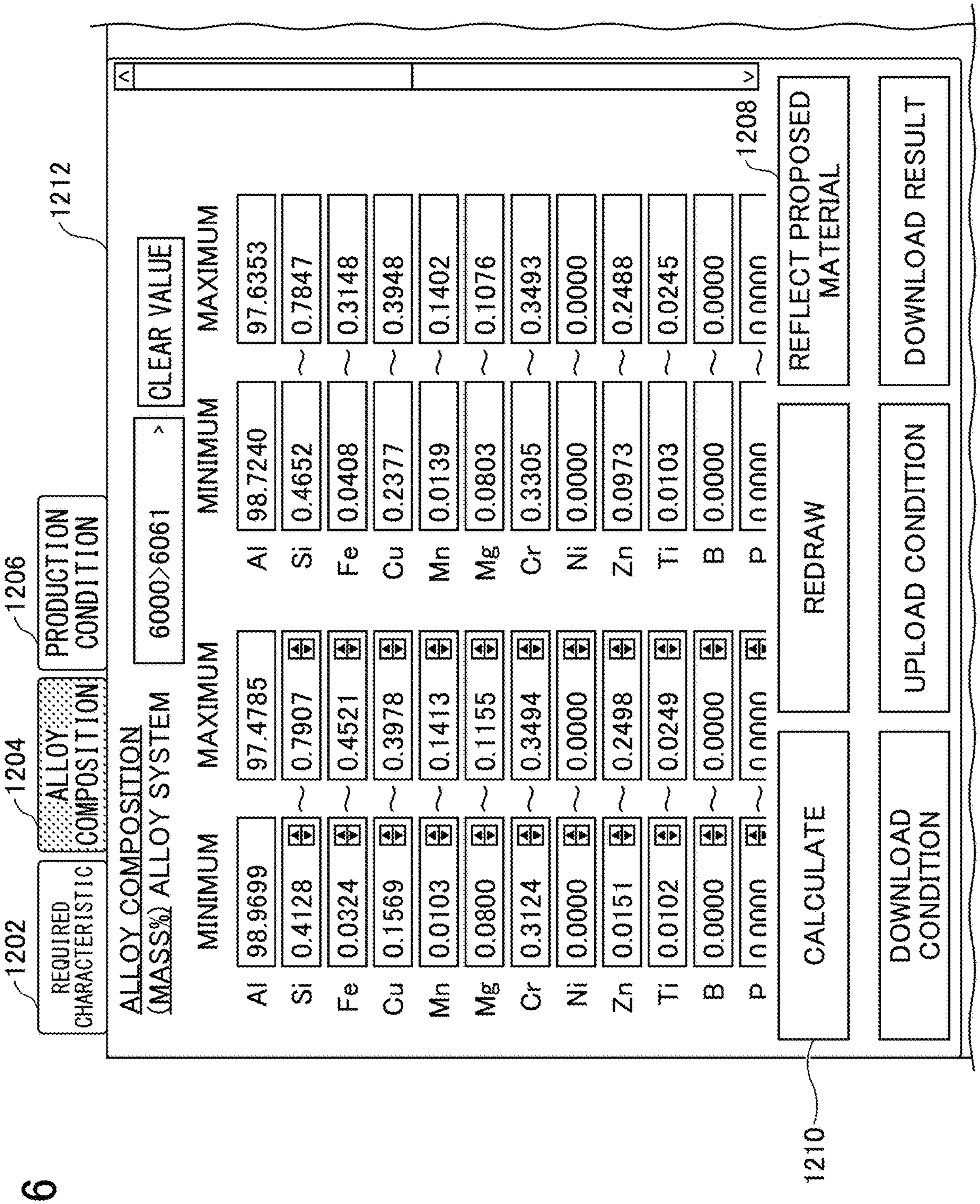
FIG. 16 is an image diagram illustrating an example of an input screen.

When the user terminal 12 displaying the output screen such as the output screen 1112 of FIG. 13, the output screen 1114 of FIG. 14, or the output screen 1114 of FIG. 15 receives a user operation to change to the input screen, the design condition adjustment unit 38 displays the input screen 1212 illustrated in FIG. 16, for example, on the user terminal 12 to propose the narrowed range of the design condition for the 6061 alloy to the user.

FIG. 16 is an image diagram of an example of the input screen. In the input screen 1212 of FIG. 16, the range of the previously re-set design condition is illustrated on the left, and the range of the previously re-set design condition further narrowed (a proposed material) is illustrated on the right.

The design condition adjustment unit 38 extracts, for example, the exhaustive prediction point that satisfies the range of the modified required characteristic of the 6061 alloy, and narrows the range of the design condition based on the extracted exhaustive prediction point. For example, the design condition adjustment unit 38 proposes the range of the design condition corresponding to the exhaustive prediction point that satisfies the modified range of the required characteristic to the user as the range of the narrowed design condition.

Figure 17:
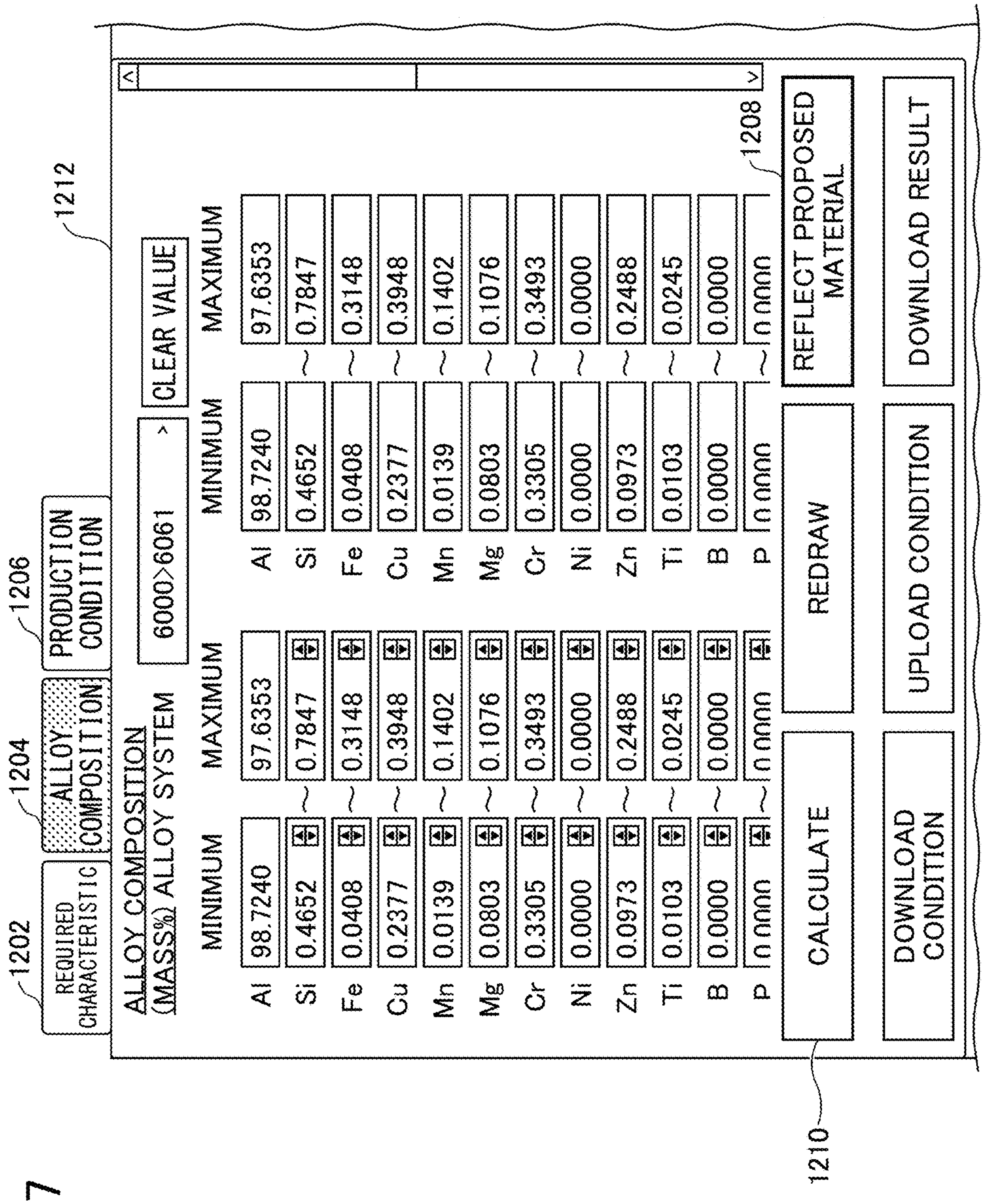
FIG. 17 is an image diagram illustrating an example of an input screen.

By performing a selection operation such as pressing the “reflect proposed material” button 1208 on the input screen 1212 of FIG. 16, the user can transfer the narrowed range of the design condition for the 6061 alloy displayed on the right side to the range of the design condition on the left side, as illustrated in FIG. 17. FIG. 17 is an image diagram of an example of the input screen.

By performing a selection operation such as pressing the “calculate” button 1210 of the input screen 1212 of FIG. 17, the user can regenerate the exhaustive prediction points from the narrowed range of the design condition for the 6061 alloy and re-predict the characteristic value of the 6061 alloy for each of the regenerated exhaustive prediction points.

When the exhaustive prediction point generation unit 34 of FIG. 5 receives the information of the narrowed range of the design condition for the 6061 alloy from the design condition adjustment unit 38, the exhaustive prediction point generation unit 34 regenerates the exhaustive prediction points from the narrowed range of the design condition for the 6061 alloy. The prediction unit 36 inputs the plurality of exhaustive prediction points regenerated from the narrowed range of the design condition for the 6061 alloy to the trained model, and re-predicts the characteristic value of the 6061 alloy for each of the regenerated exhaustive prediction points.

The design condition-material characteristic table storage 52 restores the characteristic value of the 6061 alloy for each of the re-predicted exhaustive prediction points in the design condition-material characteristic table, in association with the exhaustive prediction point used for the re-prediction of the characteristic value.

Figure 18:
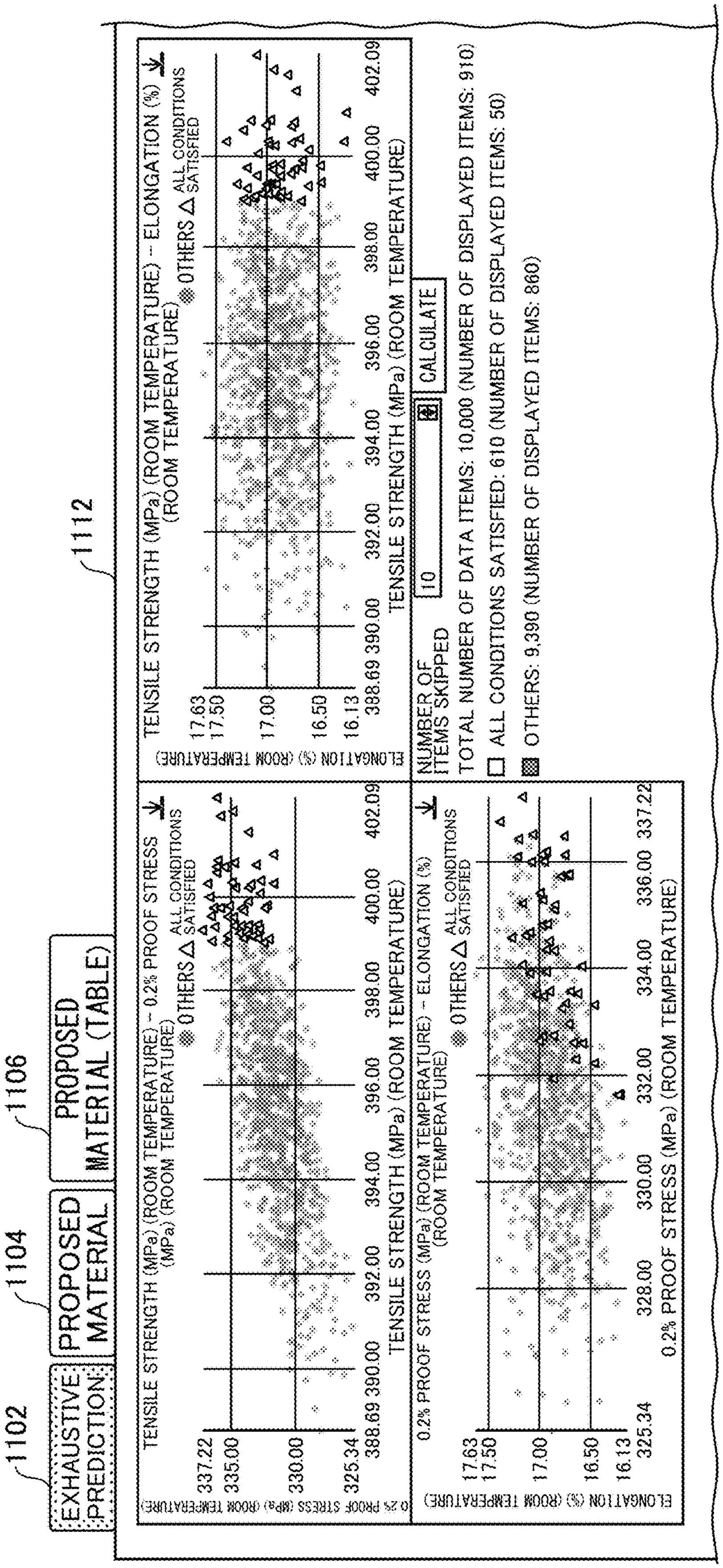
FIG. 18 is an image diagram illustrating an example of an output screen.

The design condition adjustment unit 38 extracts a data set from the design condition-material characteristic table storage 52, and by using the data set, displays an output screen as illustrated in FIG. 18 on the user terminal 12 for checking by the user.

FIG. 18 is an image diagram of an example of the output screen. In the output screen 1112 illustrated in FIG. 18, as in the output screen 1112 illustrated in FIG. 9, the display page is switched by the selection operation of the tabs 1102 to 1106. In the output screen 1112 illustrated in FIG. 18, as in FIG. 9 and the like, the exhaustive prediction points satisfying the range of the required characteristic of the 6061 alloy set by the required characteristic setting unit 32 are plotted with a triangle “Δ”, and the exhaustive prediction points not satisfying the range of the required characteristic of the 6061 alloy set by the required characteristic setting unit 32 are plotted with a circle “●”.

By checking the output screen 1112 of FIG. 18, the user can see that the number of exhaustive prediction points that satisfy the range of the required characteristic of the 6061 alloy set by the required characteristic setting unit 32 has decreased from before narrowing the range of the required characteristic of the 6061 alloy.

Figure 19:
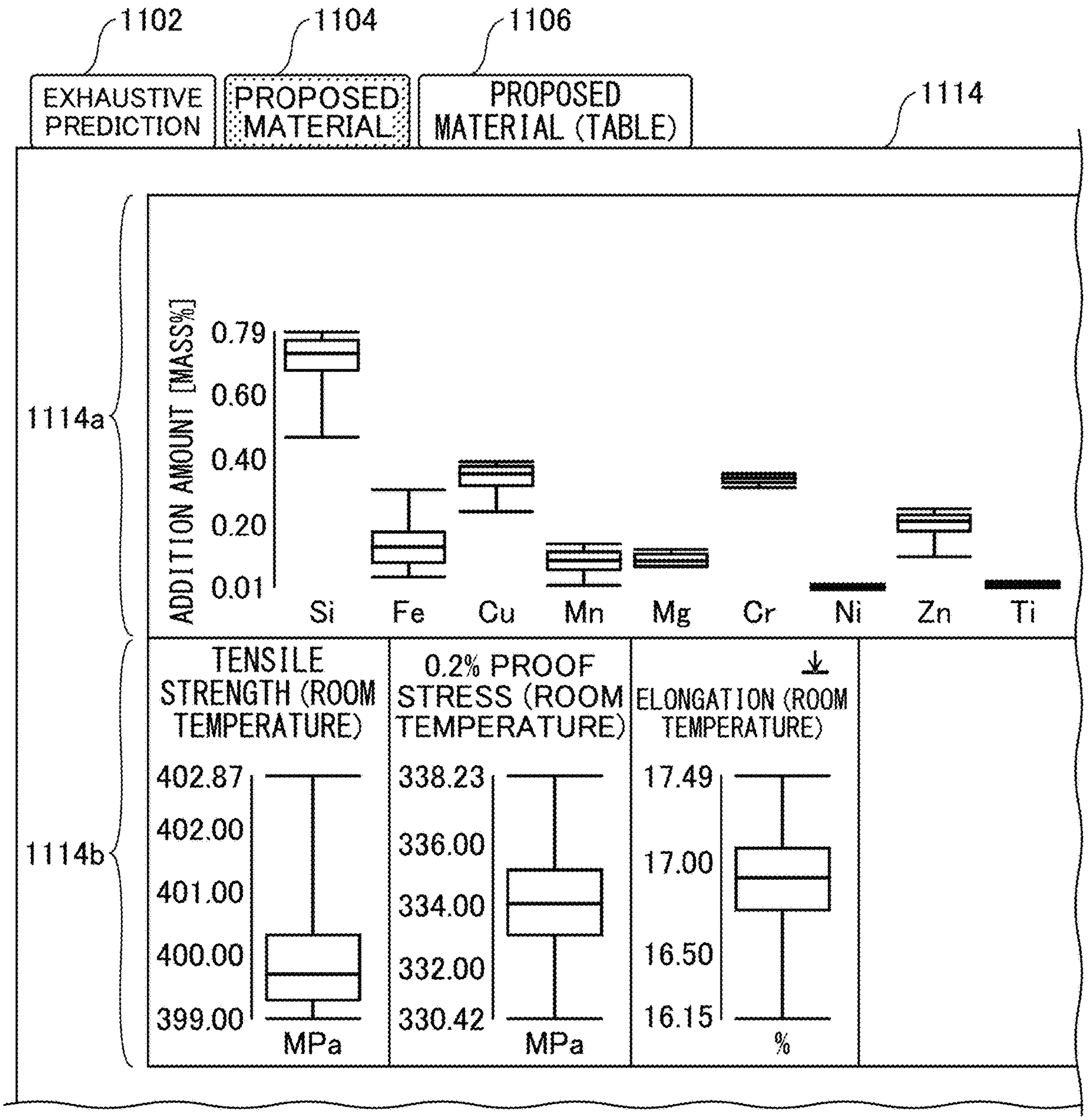
FIG. 19 is an image diagram illustrating an example of an output screen.

By the selection operation of the tab 1104 illustrated in FIG. 18, the output screen 1112 illustrated in FIG. 18 changes to the output screen 1114 illustrated in FIG. 19. FIG. 19 is an image diagram of an example of the output screen. In the output screen 1114 illustrated in FIG. 19, the upper part 1114*a* illustrates a box-and-whisker diagram of the range of the composition satisfying the range of the required characteristic of the 6061 alloy. In FIG. 19, the lower part 1114*b* illustrates a box-and-whisker diagram of the range of the re-predicted characteristic value satisfying the range of the required characteristic of the 6061 alloy.

By checking the output screen 1114 of FIG. 19, the user can re-extract the exhaustive prediction point satisfying the modified range of the required characteristic of the 6061 alloy among the plurality of exhaustive prediction points regenerated by the exhaustive prediction point generation unit 34, and check the range of the re-predicted characteristic value corresponding to the exhaustive prediction point.

For example, in the example of the output screen 1114 of FIG. 19, the maximum value of tensile strength predicted as one of the characteristic values of the 6061 alloy increases from “402.12” to “402.87”. In contrast, in the example of the output screen 1114 of FIG. 19, the maximum value of 0.2% proof stress predicted as one of the characteristic values of the 6061 alloy decreases from “338.47” to “338.23”. In the example of the output screen 1114 illustrated in FIG. 19, the maximum value of elongation predicted as one of the characteristic values of the 6061 alloy decreases from “17.87” to “17.49”. For example, when the design objective is “maximizing tensile strength”, the example of the output screen 1114 of FIG. 19 satisfies the design objective more than the example of the output screen 1114 of FIG. 14.

Figure 20:
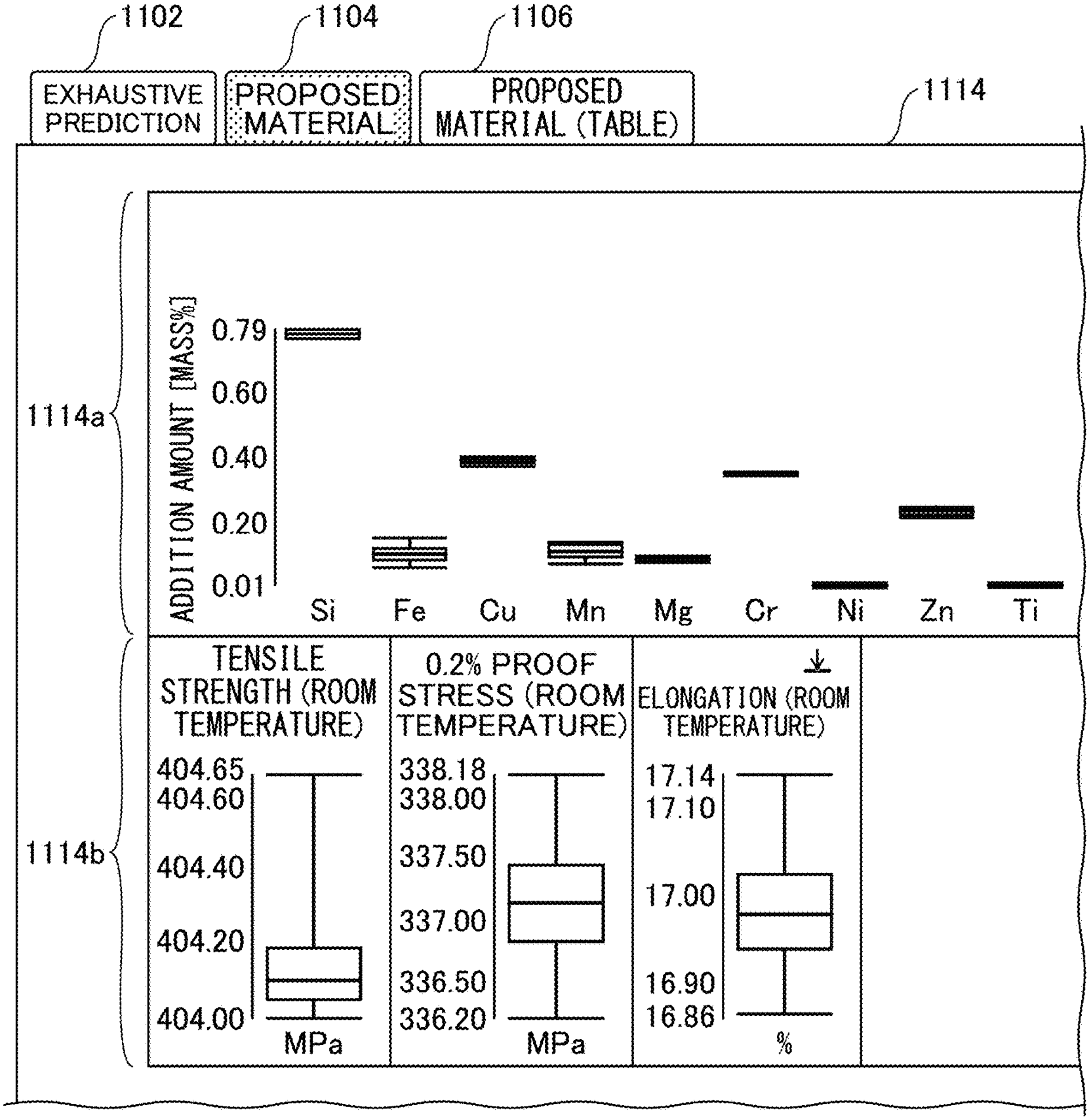
FIG. 20 is an image diagram illustrating an example of an output screen.

By repeating the above process, the user can check, for example, the range of the composition satisfying the range of the required characteristic of the 6061 alloy and the re-predicted range of the characteristic value satisfying the range of the required characteristic of the 6061 alloy, as illustrated in the output screen 1114 illustrated in FIG. 20. In the example illustrated in the output screen 1114 illustrated in FIG. 20, the maximum value of tensile strength predicted as one of the characteristic values of the 6061 alloy is increased to “404.65”.

Figure 21:
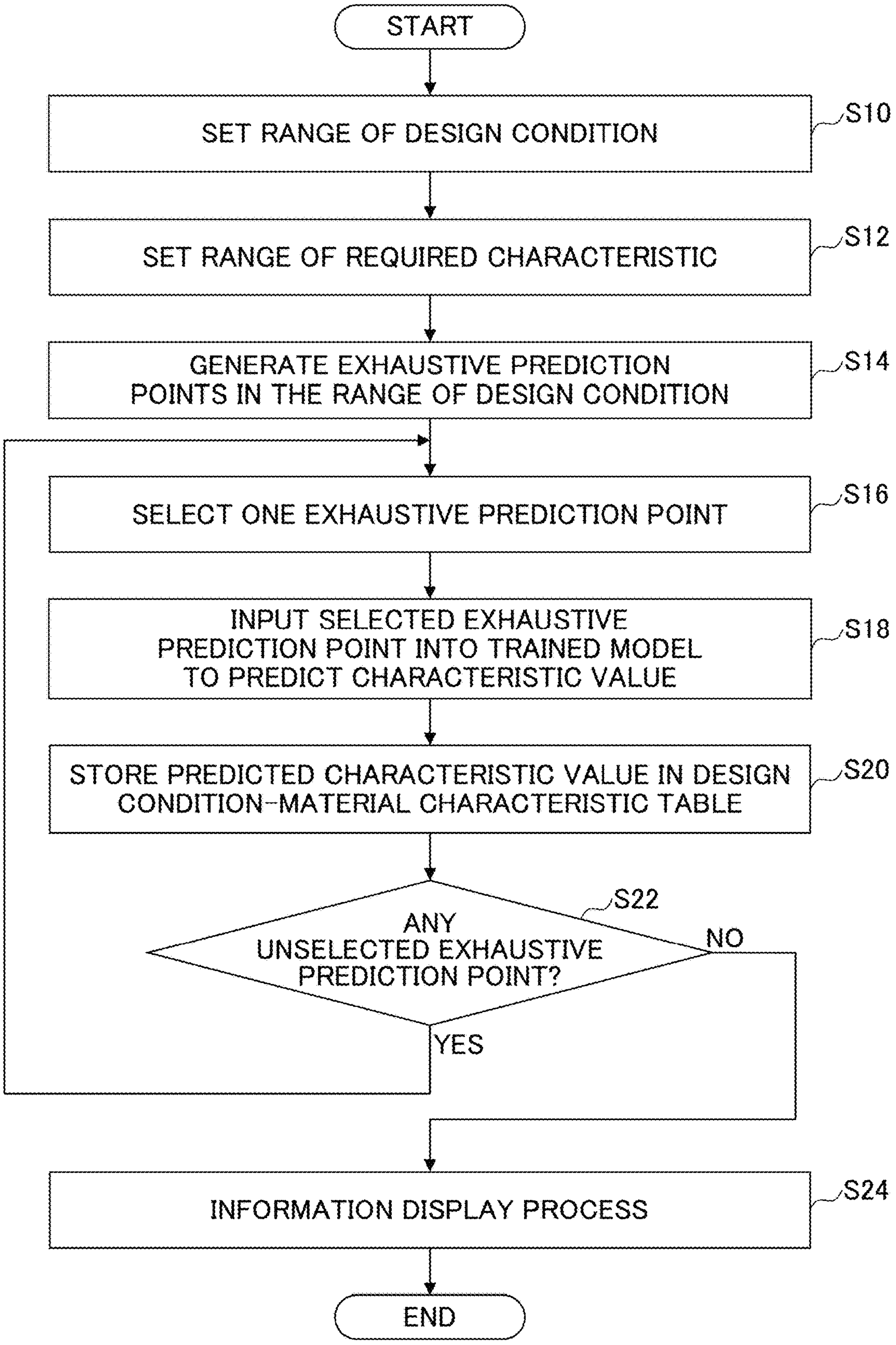
FIG. 21 is a flowchart illustrating an example of a process of storing the design condition-material characteristic table of the material design support system in the design condition-material characteristic table storage according to one embodiment.

FIG. 21 is a flowchart illustrating an example of a process of storing the design condition-material characteristic table in the design condition-material characteristic table storage of the material design support system according to the present embodiment.

In step S10, the design condition setting unit 30 causes the user terminal 12 to display the input screen 1012 as illustrated in FIG. 6, for example, for the user to set the range of the design condition for the 6061 alloy as the design target material.

In step S12, the required characteristic setting unit 32 causes the user terminal 12 to display the input screen 1014 as illustrated in FIG. 8, for example, for the user to set the range of the required characteristic for the 6061 alloy as the design target material.

In step S14, the exhaustive prediction point generation unit 34 generates a plurality of exhaustive prediction points, such as 10,000 points, within the range of the design condition for the 6061 alloy that the design condition setting unit 30 has received from the user. In step S16, the prediction unit 36 selects one unselected exhaustive prediction point from the plurality of exhaustive prediction points generated by the exhaustive prediction point generation unit 34.

In step S18, the prediction unit 36 reads out the trained model from the trained model storage 50. The prediction unit 36 inputs one exhaustive prediction point selected in step S16 into the trained model and predicts the characteristic value of the one exhaustive prediction point selected in step S16. In step S20, the design condition-material characteristic table storage 52 generates a data set in which the one exhaustive prediction point selected in step S16 is associated with a characteristic value predicted by inputting the one exhaustive prediction point into the trained model, and stores the data set in the design condition-material characteristic table.

In step S22, the prediction unit 36 determines whether there is an unselected exhaustive prediction point in the exhaustive prediction points generated by the exhaustive prediction point generation unit 34. When there is an unselected exhaustive prediction point, the prediction unit 36 returns to the process in step S16 and continues generating the data set.

Figure 22:
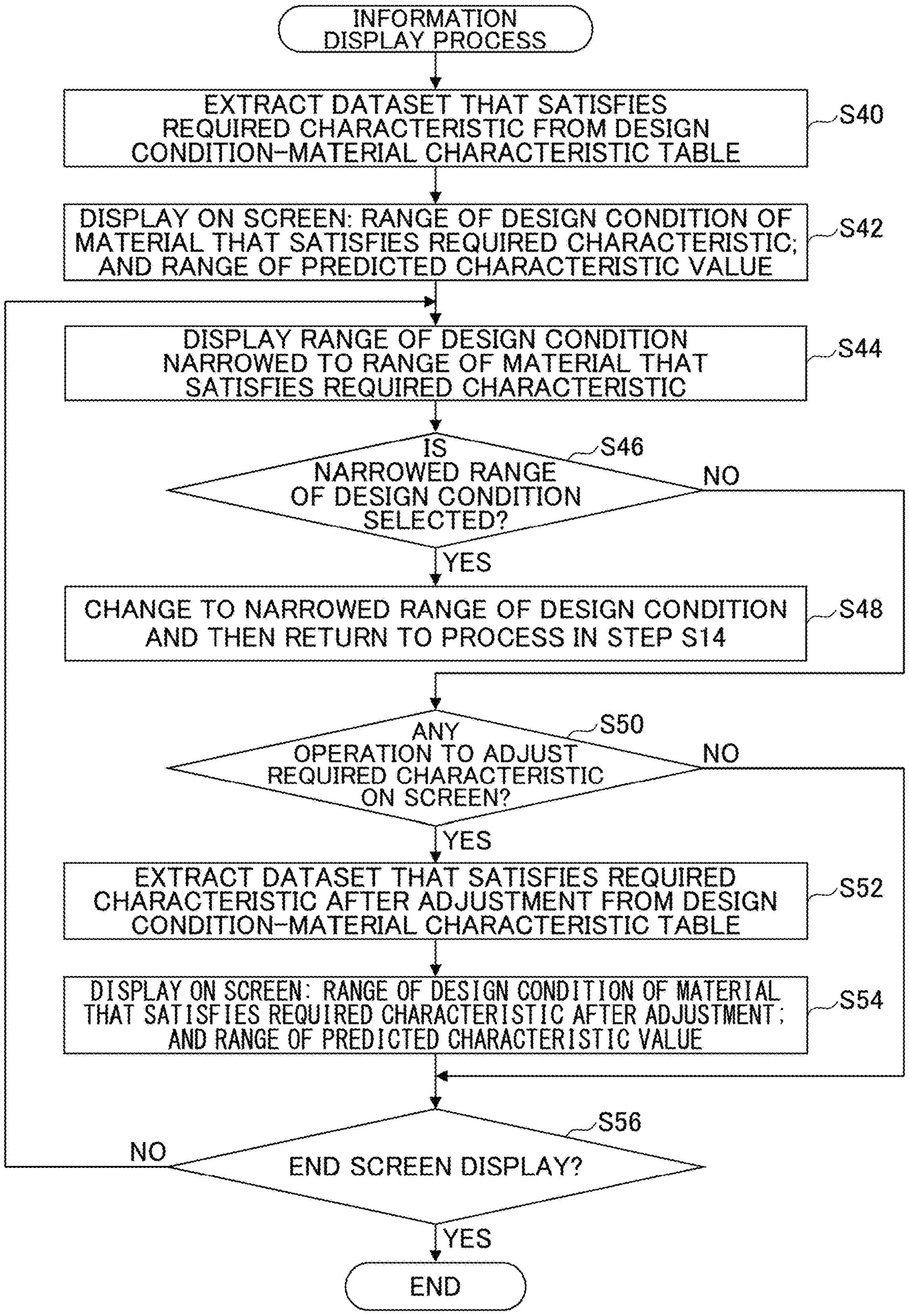
FIG. 22 is a flowchart illustrating an example of a process of narrowing the design conditions using the design condition-material characteristic table of the material design support system according to one embodiment.

When there is no unselected exhaustive prediction point, the material design support system 1 according to the present embodiment proceeds to an information display process in step S24 and performs the process for narrowing the design condition using the design condition-material characteristic table. FIG. 22 is a flowchart illustrating an example of the process for narrowing the design condition using the design condition-material characteristic table of the material design support system according to the present embodiment.

In step S40, the design condition adjustment unit 38 extracts a data set satisfying the required characteristic from the design condition-material characteristic table storage 52. In step S42, by using the extracted data set, the design condition adjustment unit 38 causes the user terminal 12 to display the output screen 1114 illustrated in FIG. 10, for example, for the user to check the range of the design condition satisfying the range of the required characteristic of the 6061 alloy and the range of the predicted characteristic value.

For example, when the user terminal 12 displaying the output screen such as the output screen 1114 of FIG. 10 receives a user operation to change to the input screen, the design condition adjustment unit 38 proceeds to the process of step S44. The design condition adjustment unit 38 displays the input screen 1212 illustrated in FIG. 11, for example, on the user terminal 12, and proposes the narrowed range of the design condition for the 6061 alloy to the user.

For example, when the user selects the narrowed range of the design condition for the 6061 alloy proposed in step S44, the user performs a selection operation such as pressing the "reflect proposed material" button 1208 on the input screen 1212 illustrated in FIG. 11.

In step S46, the design condition adjustment unit 38 determines whether the narrowed range of the design condition for the 6061 alloy proposed in step S44 has been selected by the user. When the narrowed range of the design condition for the 6061 alloy proposed in step S44 has been selected by the user, the design condition adjustment unit 38 proceeds to the process in step S48, changes to the narrowed range of the design condition for the 6061 alloy proposed in step S44, and returns to the process in step S14.

Therefore, in the material design support system 1 according to this embodiment, the exhaustive prediction points can be regenerated from the narrowed range of the design condition for the 6061 alloy, and the characteristic value of the 6061 alloy can be re-predicted for each of the regenerated exhaustive prediction points.

When the user does not select the narrowed range of design condition for the 6061 alloy proposed in step S44, the design condition adjustment unit 38 proceeds to the process of step S50. In step S50, the design condition adjustment unit 38 determines whether or not a user operation to adjust the range of the required characteristic has been received via the output screen 1114 of FIG. 14 and the like, for example.

When the user operation to adjust the range of the required characteristic is received, the design condition adjustment unit 38 proceeds to the process in step S52. In step S52, the design condition adjustment unit 38 extracts a data set satisfying the adjusted required characteristic from the design condition-material characteristic table. In step S54, by using the extracted data set, the design condition adjustment unit 38 causes the user terminal 12 to display the output screen 1114 illustrated in FIG. 15, for example, for the user to check the range of the design condition satisfying the adjusted range of the required characteristic and the range of the predicted characteristic value.

When the user operation to adjust the range of the required characteristic is not received, the design condition adjustment unit 38 skips the process in steps S52 and S54. In step S56, the design condition adjustment unit 38 determines whether the user operation to end the screen display is received. When the user operation to end the screen display is not received, the design condition adjustment unit 38 returns to the process of step S44. When the user operation to end the screen display is received, the design condition adjustment unit 38 ends the information display process illustrated in FIG. 22.

According to the process illustrated in FIGS. 21 and 22, not only can the design condition be narrowed to the range that satisfies the required characteristic of the design target material, based on the characteristic value of the design target material predicted by the trained model and the required characteristic of the design target material, but also, production constraints based on the user's experience can be taken into account.

The process illustrated in FIGS. 21 and 22 includes user operations to select or not to select the narrowed range of the design condition for the 6061 alloy, and user operations to adjust the range of the required characteristic to narrow the range of the design condition for the 6061 alloy. For example, in the material design support system 1 according to the present embodiment, as illustrated in FIG. 23, the embodiment may be such that: the user operation to select or not to select the narrowed range of the design condition for the 6061 alloy and the user operation to adjust the range of the required characteristic to narrow the range of the design condition for the 6061 alloy, are omitted and automated.

Figure 23:
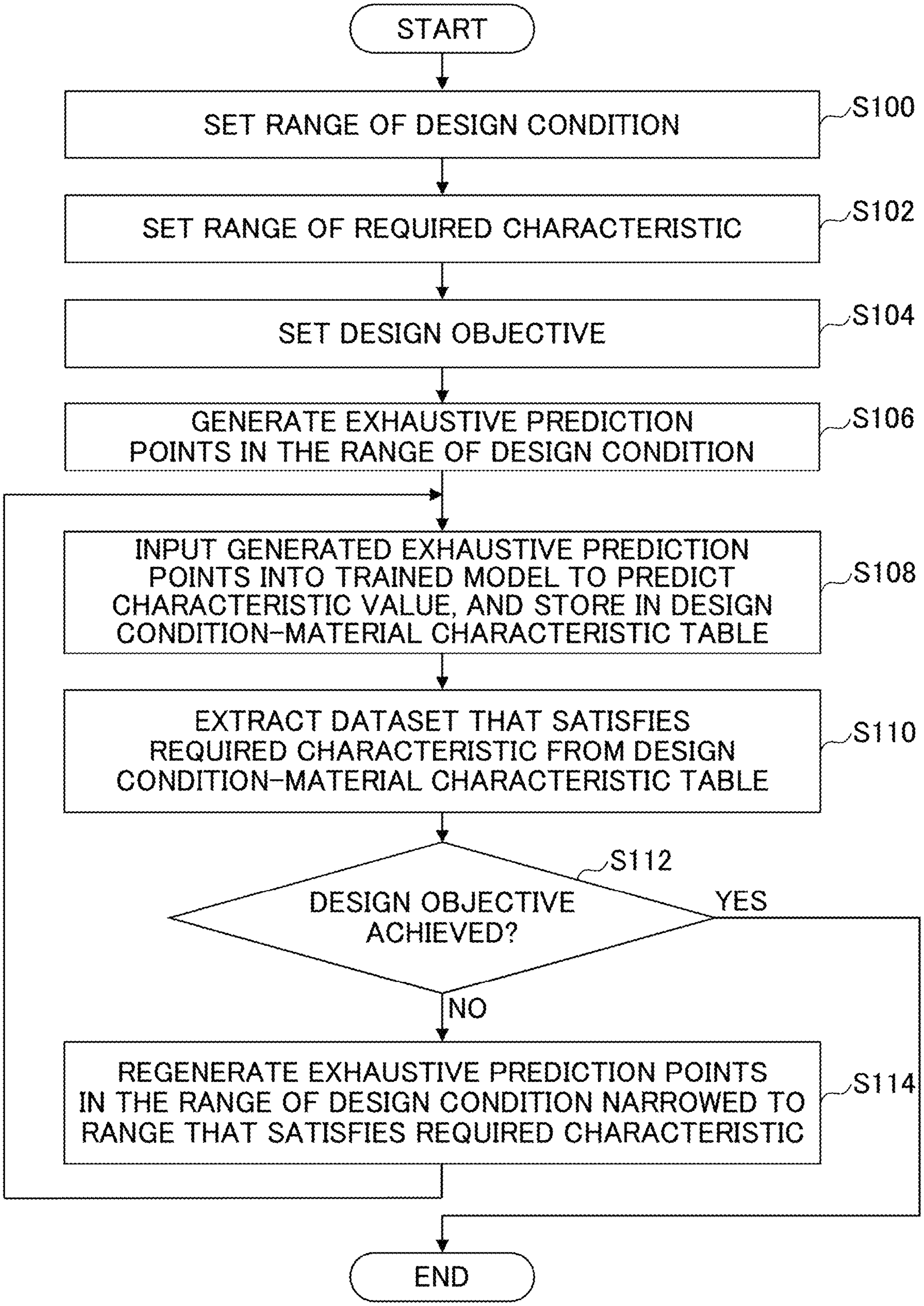
FIG. 23 is a flowchart illustrating an example of a process of narrowing the design conditions using the design condition-material characteristic table of the material design support system according to one embodiment.

FIG. 23 is a flowchart illustrating an example of the process to narrow the design condition using the design condition-material characteristic table of the material design support system according to the present embodiment.

In step S100, the design condition setting unit 30 causes the user terminal 12 to display the input screen 1012 as illustrated in FIG. 6, for example, for the user to set the range of the design condition for the 6061 alloy as the design target material.

In step S102, the required characteristic setting unit 32 causes the user terminal 12 to display the input screen 1014 as illustrated in FIG. 8, for example, for the user to set the range of the required characteristic for the 6061 alloy as the design target material. In step S104, the required characteristic setting unit 32 allows the user to set the design objective. The design objective is, for example, "maximizing tensile strength", and enables determination using the predicted characteristic value.

In step S106, the exhaustive prediction point generation unit 34 generates a plurality of exhaustive prediction points, such as 10,000 points, within the range of the design condition for the 6061 alloy, which the design condition setting unit 30 has received from the user. In step S108, the prediction unit 36 inputs the exhaustive prediction points generated by the exhaustive prediction point generation unit 34 into the trained model to predict the characteristic value of each of the plurality of exhaustive prediction points. The design condition-material characteristic table storage 52 generates a data set in which the exhaustive prediction point is associated with the characteristic value predicted by inputting the exhaustive prediction point into the trained model, and stores the data in the design condition-material characteristic table.

In step S110, the design condition adjustment unit 38 extracts a data set satisfying the required characteristic from the design condition-material characteristic table. The design condition adjustment unit 38 can analyze, by using the extracted data set, the range of the design condition satisfying the range of the required characteristic of the 6061 alloy and the predicted range of the characteristic value.

In step S112, the design condition adjustment unit 38 determines whether the design objective such as "maximizing tensile strength" set in step S104 has been achieved. When the design objective has not been achieved, the design condition adjustment unit 38 proceeds to the process in step S114. In step S114, the material design support system 1 according to the present embodiment regenerates a plurality of exhaustive prediction points within the range of the design condition narrowed to the range satisfying the range of the required characteristic, and returns to the process in step S108. Further, when the design objective is, for example, "maximizing tensile strength", a step may be added in which the data having the highest tensile strength (the top 2.5% of the data, and the like) is extracted and a plurality of exhaustive prediction points are regenerated within the range of the design condition.

Thus, the material design support system 1 according to the present embodiment repeats the processes of steps S108 to S114, narrowing the design objective to the range of the design condition satisfying the range of the required characteristic, until the design objective such as "maximizing tensile strength" set in step S104 is achieved. When the design objective is achieved, the material design support system 1 according to the present embodiment ends the processing of the flowchart of FIG. 23.

According to the processing illustrated in FIG. 23, the process of narrowing the design condition to the range that satisfies the required characteristic of the design target material, based on the required characteristic of the design target material and the characteristic value of the design target material predicted by the trained model, can be automated.

OTHER EMBODIMENTS

The results of the processing for supporting the optimization of the design condition for the material, performed by the material design support apparatus 10 according to the present embodiment, may be used as input information to a production apparatus for generating a design target material, such as an aluminum alloy and the like. The results of the processing performed by the material design support apparatus 10 according to the present embodiment may be input to the production apparatus. As a result, technical parameters of the production apparatus are determined such that design target materials in a range satisfying the required characteristic are produced, and the production process can be controlled.

In the present embodiment, an example has been described in which the exhaustive prediction point generation unit 34 generates one set of a plurality of exhaustive prediction points within the set range of the design condition for the design target material, but a plurality of sets may be generated, and the set that best satisfies the required characteristic may be selected and used.

The material design support system 1 according to the present embodiment can provide a material design support apparatus, a material design support method, and a program for supporting efficient optimization of the design conditions for the design target materials.

Although the embodiments are described heretofore, various modifications to the form and details may be made without departing from the subject matter and scope of the appended claims.

Although the present invention is described with reference to the embodiments, the present invention is not limited to the embodiments described above, and various modifications can be made without departing from the scope of the subject matter recited in the claims. The present international application is based upon and claims priority to Japanese Patent Application No. 2021-120261, filed on Jul. 21, 2021, the entire contents of which are incorporated herein by reference.

DESCRIPTION OF REFERENCE NUMERALS

1 Material design support system
10 Material design support apparatus
12 User terminal
18 Communication network
20 Information display unit
22 Operation reception unit
24 Request transmission unit
26 Response reception unit
30 Design condition setting unit
32 Required characteristic setting unit
34 Exhaustive prediction point generation unit
36 Prediction unit
38 Design condition adjustment unit
40 Request response control unit
50 Training model storage
52 Design condition-material characteristic table storage
502 Display device

The invention claimed is:

1. A material design support apparatus for supporting optimization of a design condition for a material, the material design support apparatus comprising:

a memory; and a processor coupled to the memory and configured to:

set a range of a design condition for a material;

set a range of a required characteristic of the material;

generate a plurality of exhaustive prediction points within the range of the design condition;

input the exhaustive prediction points into a trained model in which a correspondence between a design condition for the material and a characteristic value of the material is learned, thereby to predict a characteristic value of the material;

narrow the range of the design condition for the material used for generating the plurality of exhaustive prediction points, based on the predicted characteristic value of the material for each of the exhaustive prediction points and the range of the required characteristic of the material; and regenerate a plurality of exhaustive prediction points within the narrowed range of the design condition for the material and re-predict the characteristic value of the material.

2. The material design support apparatus according to claim 1, wherein the processor is configured to extract, from the predicted characteristic value of the material for each of the exhaustive prediction points, a range of the design condition for the material that satisfies the range of the required characteristic of the material, and to narrow, based on the extracted range of the design condition for the material, the range of the design condition for the material used for generating the plurality of exhaustive prediction points.

3. The material design support apparatus according to claim 1, wherein the processor is further configured to display: the range of the design condition for the material corresponding to the plurality of exhaustive prediction points that satisfies the range of the required characteristic of the material; and a range of predicted characteristic values of the material of the plurality of exhaustive prediction points that satisfies the range of the required characteristic of the material, and wherein the processor is configured to change, in response to a user operation to change the range of the required characteristic of the material that is displayed, the range of the design condition for the material.

4. The material design support apparatus according to claim 1, wherein the processor is configured to repeat, until a range of the predicted characteristic value of the material of each of the plurality of exhaustive prediction points achieves a design objective, a process of narrowing the range of the design condition for the material used for generating the plurality of exhaustive prediction points.

5. The material design support apparatus according to claim 1, wherein the design condition for the material includes a composition and a production condition of the material.

6. The material design support apparatus according to claim 1, wherein the characteristic value of the material is at least one selected from a group consisting of tensile strength, 0.2% proof stress, elongation, coefficient of linear expansion, Young's modulus, Poisson's ratio, fatigue strength, hardness, creep property, shear strength, Charpy impact value, specific heat, thermal conductivity, electrical resistivity, density, solidus, and liquidus.

7. The material design support apparatus according to claim 1, wherein the processor is further configured to input the re-predicted characteristic value of the material to a production apparatus that produces the material.

8. A system comprising:

the material design support apparatus according to claim 1; and a production apparatus that produces the material, wherein the processor of the material design support apparatus is further configured to input the re-predicted characteristic value of the material to the production apparatus.

9. A material design support method executed by a computer for supporting optimization of a design condition for a material, the material design support method comprising:

setting a range of a design condition for a material;

setting a range of a required characteristic of the material;

generating a plurality of exhaustive prediction points within the range of the design condition;

inputting the exhaustive prediction points into a trained model in which a correspondence between a design condition for the material and a characteristic value of the material is learned, thereby predicting a characteristic value of the material;

narrowing the range of the design condition for the material used for generating the plurality of exhaustive prediction points, based on the predicted characteristic value of the material for each of the exhaustive prediction points and the range of the required characteristic of the material; and regenerating a plurality of exhaustive prediction points within the narrowed range of the design condition for the material and re-predict the characteristic value of the material.

10. A non-transitory computer-readable recording medium storing a program for causing a computer for supporting optimization of a design condition for a material, to execute:

setting a range of a design condition for a material;

setting a range of a required characteristic of the material;

generating a plurality of exhaustive prediction points within the range of the design condition;

inputting the exhaustive prediction points into a trained model in which a correspondence between a design condition for the material and a characteristic value of the material is learned, thereby predicting a characteristic value of the material;

narrowing the range of the design condition for the material used for generating the plurality of exhaustive prediction points, based on the predicted characteristic value of the material for each of the exhaustive prediction points and the range of the required characteristic of the material; and regenerating a plurality of exhaustive prediction points within the narrowed range of the design condition for the material and re-predict the characteristic value of the material.

* * * * *